(12) United States Patent
Miyazaki

(10) Patent No.: US 7,293,843 B2
(45) Date of Patent: Nov. 13, 2007

(54) BRAKING SYSTEM FOR VEHICLE

(75) Inventor: Tetsuya Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/821,984

(22) Filed: Apr. 12, 2004

(65) Prior Publication Data
US 2004/0222695 A1 Nov. 11, 2004

(30) Foreign Application Priority Data
Apr. 21, 2003 (JP) ............... 2003-115514

(51) Int. Cl.
B60T 8/34 (2006.01)
(52) U.S. Cl. ............ 303/113.4; 303/158; 303/183; 303/115.2; 303/20
(58) Field of Classification Search .......... 303/3, 303/15, 138, 154, 155, 156, 157, 158, 174, 303/177, 183, 113.4, 115.2, 116.1, 20
See application file for complete search history.

(56) References Cited

U.S. PATENT DOCUMENTS

| | | | | |
|---|---|---|---|---|
| 5,230,549 A * | 7/1993 | Osada et al. | | 303/3 |
| 5,716,108 A * | 2/1998 | Asa et al. | | 303/3 |
| 5,839,800 A * | 11/1998 | Koga et al. | | 303/152 |
| 5,857,755 A * | 1/1999 | Aoki et al. | | 303/152 |
| 6,149,248 A * | 11/2000 | Lubbers et al. | | 303/114.1 |
| 6,289,271 B1 * | 9/2001 | Isono et al. | | 701/31 |
| 6,290,310 B1 * | 9/2001 | Kusano | | 303/122.11 |
| 6,568,768 B1 * | 5/2003 | Oka et al. | | 303/113.3 |
| 2003/0214179 A1 * | 11/2003 | Kusano | | 303/115.1 |

FOREIGN PATENT DOCUMENTS

| | | |
|---|---|---|
| JP | A 11-301434 | 11/1999 |
| JP | A 2001-206208 | 7/2001 |
| JP | A 2001-239925 | 9/2001 |

* cited by examiner

Primary Examiner—Devon Kramer
(74) Attorney, Agent, or Firm—Oliff & Berridge PLC

(57) ABSTRACT

A braking system for a vehicle, including a braking device which puts brake on a vehicle; an operating device which includes an operating member that is operated by a driver of the vehicle in a braking force increasing direction, that is, an operating direction in which a braking force of the braking device is increased or in a braking force decreasing direction, that is, an operating direction in which the braking force of the braking device is decreased; and a control device which decides a target control value for controlling the braking device based on an operation state amount of the operating member and which controls the braking device based on the decided target control value, wherein the control device includes an operating direction-dependant target control value deciding portion which sets an increasing direction target control value that is the target control value when the operating member is operated in the braking force increasing direction, and a decreasing direction target control value that is the target control value when the operating member is operated in the braking force decreasing direction to values different from each other at least in part of a control range.

20 Claims, 19 Drawing Sheets

HIGH BRAKING FORCE CONTROL RANGE

BRAKING SYSTEM FOR VEHICLE

INCORPORATION BY REFERENCE

The disclosure of Japanese Patent Application No. 2003-115514 filed on Apr. 21, 2003, including the specification, drawings and abstract is incorporated herein by reference in its entirety.

BACKGROUND OF THE INVENTION

1. Field of the Invention

The invention relates to a braking system for a vehicle. More particularly, the invention relates to a refinement in control of a braking device in an electronically controlled braking system.

2. Description of the Related Art

For example, in an electronically controlled braking system for a vehicle, a braking device is driven mainly by a driving force which is independent of an operating force of an operating member, and is controlled so as to generate a braking force corresponding to an operation of the operating member. Since the braking force is directly transmitted to wheels not only by the operating force of the operating member, the operation feeling of the operating member is one of the important characteristics. A typical hydraulic braking system has a configuration, for example, for detecting an operation state of a brake pedal, which is an operating member, and for controlling a hydraulic pressure of a wheel cylinder, to which a brake pad is pressed, based on the detected operation state of the brake pedal. The operation of the brake pedal can be classified into the brake pedal depressing operation (hereinafter, referred to as the "depressing operation") for increasing the braking force, and the brake pedal releasing operation (hereinafter, referred to as the "releasing operation") for decreasing the braking force. It is desirable that these two types of operations are performed with the same operating feeling in the relationship with the braking force. However, due to causes such as mechanical resistance of various devices constituting the braking system, the braking force may not decrease as much as intended by a driver, or the braking force may decrease more than intended by the driver when the releasing operation of the brake pedal is performed. These are hysteresis phenomena which occur according to the configuration of the braking system, and which have a profound effect on the operating feeling of the braking system.

Japanese Patent Laid-Open Publication No. 2001-239925 and Japanese Patent Laid-Open Publication No. 2001-206208 disclose art for improving the operating feeling of the braking system by intentionally providing hysteresis in the relationship between the brake operation and the braking force. However, the operating feeling is not always improved by generating the hysteresis. On the contrary, there are many cases that the operating feeling is improved by eliminating the hysteresis that is actually generated.

SUMMARY OF THE INVENTION

The invention is made in the light of the above-mentioned circumstances. In the invention, an operation feeling of a braking system for a vehicle is improved by performing control for reducing hysteresis which is generated due to a configuration of a component and which has an adverse effect on the operating feeling. According to an aspect of the invention, there is provided a braking system for a vehicle, including a braking device which puts brake on a vehicle; an operating device which includes an operating member that is operated by a driver of the vehicle in a direction in which a braking force is increased (hereinafter, referred to as a braking force increasing direction), that is, an operating direction in which the braking force of the braking device is increased or in a direction in which the braking force is decreased (hereinafter, referred to as a braking force decreasing direction), that is, an operating direction in which the braking force of the braking device is decreased; and a control device which decides a target control value for controlling the braking device based on an operation state amount of the operating member and which controls the braking device based on the decided target control value, wherein the control device includes an operating direction-dependant target control value deciding portion which sets an increasing direction target control value that is the target control value when the operating member is operated in the braking force increasing direction, and a decreasing direction target control value that is the target control value when the operating member is operated in the braking force decreasing direction to values different from each other at least in part of the control range.

The braking system for a vehicle according to the invention is a braking system which sets target control values for controlling the braking device to values different from each other according to the operating direction of the operating member, and which performs control based on the target control values. Control can be performed in consideration of the operating direction of the operating member in the relationship between the operation state and the braking force. Therefore, with the braking system for a vehicle according to the invention, it is possible to realize a braking system whose operating feeling is good. Also, according to the aspect, it is possible to easily suppress a hysteretic phenomenon which occurs due to the configuration of the system and in which the braking force varies depending on the operating direction even in the same operation state.

The braking device included in the system according to the invention is not particularly limited. The system according to the invention may include a friction braking device which is employed in a common vehicle. More particularly, the invention can be applied to various braking devices such as a disk brake and a drum brake.

The operating device includes an operating member. There are various types of the operating member, such as an operating pedal which is operated by a driver's foot and an operating rod which is operated by a driver's hand. A common vehicle includes a brake pedal, which corresponds to the operating member. In many cases, the operating member is operated along one path. In this case, an operating direction along the path corresponds to the braking force increasing direction, and an operating direction opposite to the operating direction along the path corresponds to the braking force decreasing direction. For example, in the case where a common brake pedal is used, the direction in which the brake pedal is depressed corresponds to the braking force increasing direction, and the direction in which the brake pedal is released corresponds to the braking force decreasing direction.

The control device controls the braking device according to the operation state of the operating member. For example, the control device may mainly include a computer and the like so as to perform electronic control. The operation state amount of the operating member, that is, the amount used as the base for the control includes the operation amount of the operating member, the operating force, the operating speed, and the like. The operation state amount may include the direct amounts of the operation amount of the operating member, the operating force, the operating speed and the like. Also, the operation state amount may include the related amounts as the indirect parameters of the operation amount of the operating member, the operating force, the operating speed and the like. When the operating member is the brake pedal, control can be performed based on, for example, the pedal stroke, the pedal depressing force, the speed at which the pedal is operated, and the like. Also, control can be performed based on the hydraulic pressure of a master cylinder related to the brake pedal, and the like, as the amount related to the pedal depressing force. The operation state amount which is used as the base for the control is not limited to one, and the control can be performed based on two or more operation state amounts. For example, an aspect may be employed in which the target control value is decided based on both the operating force and the operation amount, or both the operation amount and the operating speed. Also, an aspect may be employed in which the target control value is decided by using not only the operation state amount of the operating member but also the other state amounts such as the vehicle deceleration and the vehicle speed as the base. The target control value is not limited, and various parameters capable of controlling the braking force generated by the braking device can be employed as the target control value. For example, the value of the vehicle deceleration to be obtained may be used as the target control value. Also, in the case where a common hydraulic disk braking device is used, the value of the pressing force of the brake pad, the value of the hydraulic pressure of the wheel cylinder included in the braking device, or the like may be used as the target control value. Also, one virtual target control value may be decided, another target control value may be decided based on the virtual target control value, and the actual control may be performed based on the target control value. More particularly, an aspect may be employed in which the target vehicle deceleration is decided, the target wheel cylinder hydraulic pressure for each wheel is decided based on the target vehicle deceleration, and each wheel is controlled based on the target hydraulic pressure.

For example, when the operation state amount of the operating member and the target control value are related to each other by a relational expression, the target control value may be decided according to the relational expression. Also, when the corresponding data for relating the operation state amount and the target control value to each other (that is, called a map) is defined, the target control value may be decided based on the corresponding data. The operating direction-dependant target control value deciding portion sets the target control value of the braking force increasing direction and the target value of the braking force decreasing direction to values different from each other. An aspect can be employed in which elements for relating the operation state amounts such as the relational expression and the corresponding data, and the target control value to each other (this can be referred to as a "operation state amount-target control value function". Hereinafter, simply referred to as a "function" where appropriate) are used depending on the operating direction so as to decide the target control value. When the target operating values are set to values different from each other depending on the operating direction, an aspect in which the target control values are set to values different from each other in the entire control range may be employed, or an aspect in which the target operating values are set to values different from each other in only part of the control range depending on the purpose of the control, the characteristics of the system and the like may be employed. In this case, examples of the control range are the control range in which the braking force is used as a parameter, the control range in which the operation state amount of the operating member is used as a parameter, and the operation range in which the vehicle speed is used as a parameter.

The concrete aspect of control of the braking device based on the target control value is not particularly limited. The control of the braking device is performed according to the regularly performed control. For example, in the case where a common hydraulic pressure braking device is used, an aspect in which the feedback control and the feedforward control are performed based on the wheel cylinder hydraulic pressure, and the like may be employed.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail in terms of exemplary embodiments. The invention is not limited to the following embodiments, and the invention may be realized in various other embodiments within the scope of the invention.

Figure 1:
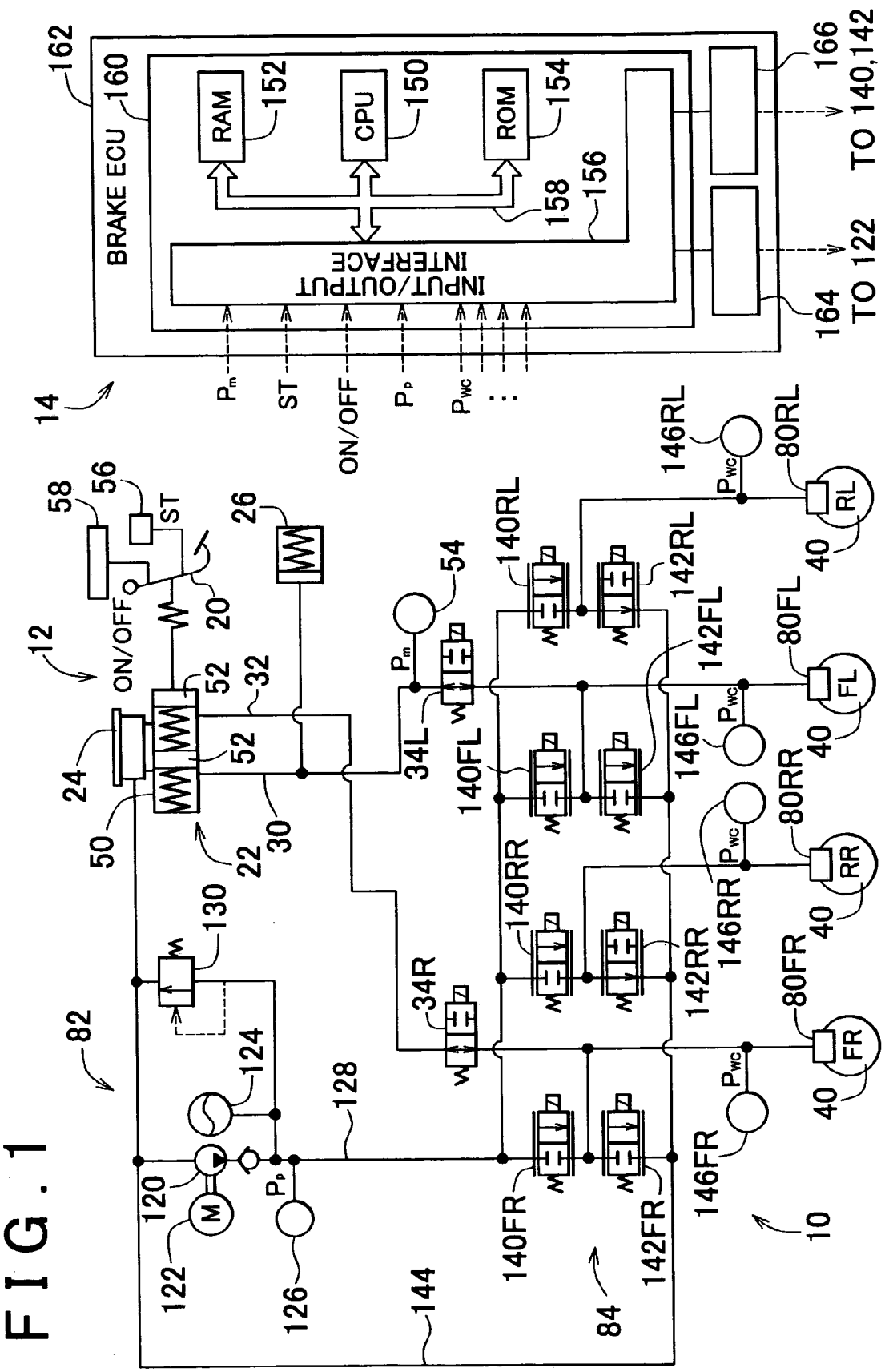
FIG. 1 is a diagram showing an entire configuration of a braking system for a vehicle, according to an embodiment of the invention.

Hereafter, a configuration of a braking system for vehicle will be described in detail. FIG. 1 shows the entire configuration of a braking system for a vehicle, which is used in a vehicle having four wheels and which is an embodiment of the invention. The braking system is a hydraulic braking system having a known configuration. The braking system mainly includes a braking device 10 which supplies a braking force to a vehicle, an operating device 12 which is used by a driver to operate the system, and a control device 14 which performs control of the braking device 10 according to an operation state of the operating device 12.

The operating device 12 includes a brake pedal 20 which serves as an operating member; a master cylinder 22 which is linked to the brake pedal 20; a reservoir 24 which is connected to the master cylinder 22; and a stroke simulator 26 which supplies a reaction force to the brake pedal 20 and which generates a pedal stroke corresponding to the depressing force. Two fluid passages 30 and 32 are connected to the master cylinder 22. The fluid passage 30 is connected to a left front wheel FL via an electromagnetic valve 34L which is normally open, and the fluid passage 32 is connected to a right front wheel FR via an electromagnetic valve 34R which is normally open (hereinafter, the electromagnetic valves 34L and 34R will be simply referred to as an "electromagnetic valve 34" where appropriate).

The master cylinder 22 is a cylinder device including a housing 50 which serves as a cylinder, and a piston 52. The piston 52 is linked to the brake pedal 20. When the brake pedal 20 is depressed, pressure is applied to the operating fluid inside the cylinder. A master cylinder hydraulic pressure Pm (hereinafter, simply referred to as a "master pressure Pm" where appropriate), that is, the hydraulic pressure of the operating fluid inside the master cylinder 22 is detected by a master pressure sensor 54. The master pressure Pm is an operating force related amount which shows the depressing force of the brake pedal 20 that serves as the operating member, that is, the amount of the operating force. Also, a pedal stroke ST which is the depressing amount of the brake pedal 20, that is, the operation amount is detected by a stroke sensor 56. An ON/OFF sensor 58, which also serves as a switch of a brake lamp, detects whether the brake pedal 20 is being operated.

Figure 2:
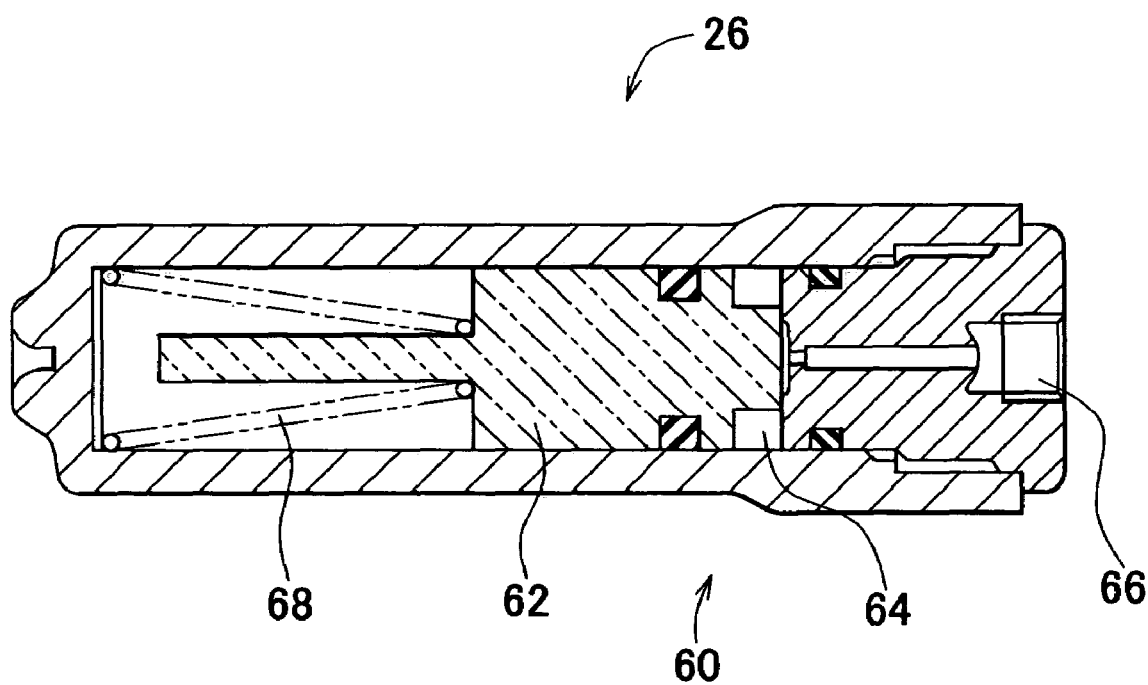
FIG. 2 is a cross sectional view showing a stroke simulator provided in an operating device of the braking system for a vehicle.

The stroke simulator 26 is provided on a fluid passage 30. The stroke simulator 26 is a so-called wet stroke simulator. As shown in FIG. 2, the stroke simulator 26 is configured as a cylinder device including a cylinder housing 60, and a piston 62 which divides the space inside the cylinder housing 60 into two and which moves so as to relatively change the volumes of the two spaces. One of the two spaces serves as a fluid chamber 64, and the fluid passage 30 is connected to a port 66. In the other space, there is provided a spring 68 which serves as an urging member that urges the piston 62 toward the fluid chamber 64. When the brake pedal 20 is depressed, part of the operating fluid flows into the fluid chamber 64, and the piston 62 is moved against the urging force of the spring 68. When the brake pedal 20 is released, the piston 62 is moved due to the urging force of the spring 68, and the operating fluid, which has flowed into the fluid chamber 64, is discharged. The stroke simulator 26 thus generates the pedal stroke corresponding to the depressing force in the operation of the brake pedal 20.

The braking device 10 includes wheel braking devices 80FL, 80FR, 80RL, and 80RR (hereinafter, simply referred to as a "wheel braking device 80" where appropriate) which are provided in wheels 40FL, 40FR, 40RL, and 40RR (hereinafter, simply referred to as a "wheel 40" where appropriate), respectively; a pump device 82 which serves as a drive source; and an electromagnetic valve device 84 which supplies the operating fluid from the pump device 82 to the wheel braking device 80 at an appropriate pressure.

Figure 3:
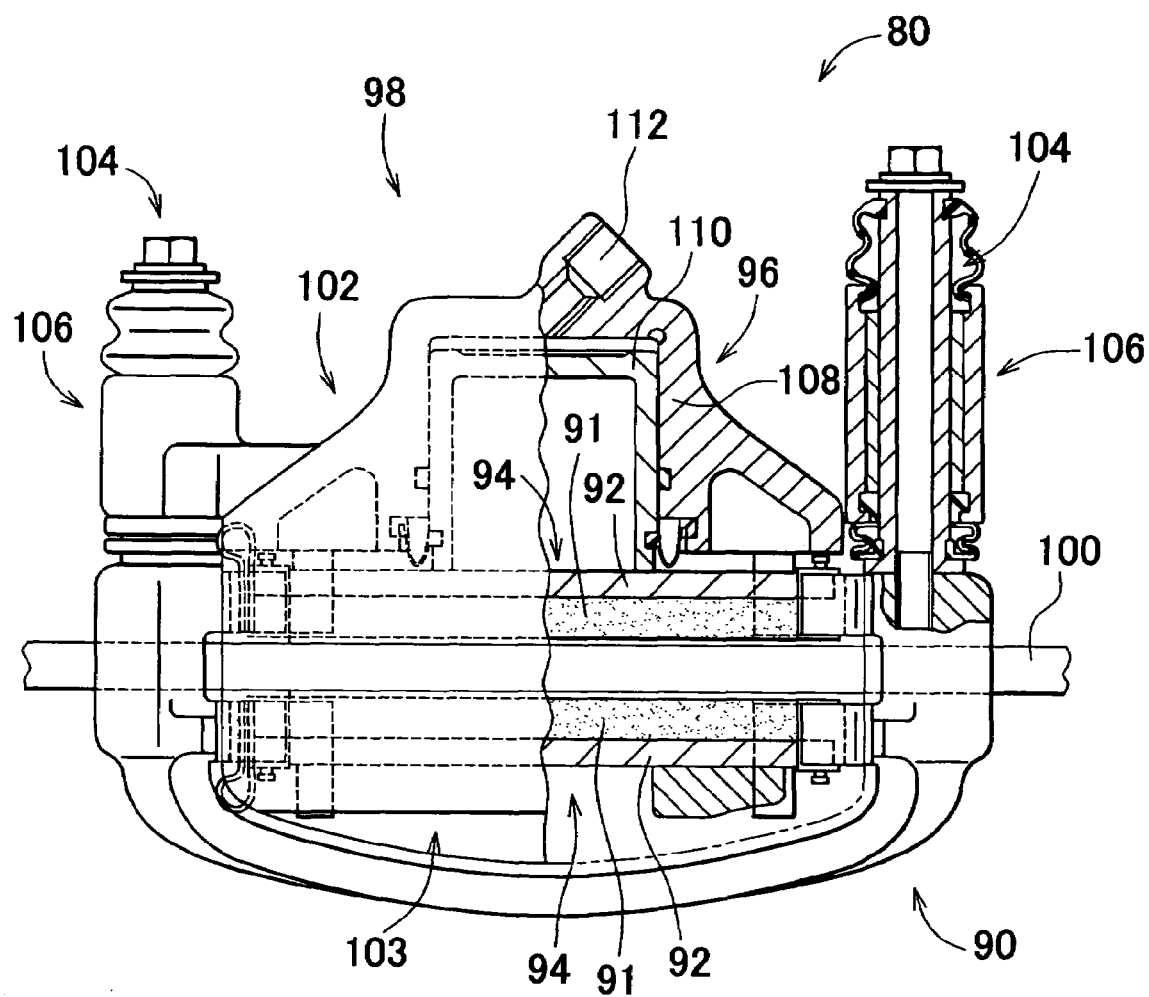
FIG. 3 is a part of a cross sectional view of a wheel braking device which is provided in each wheel, and which constitutes a braking device of the braking system for a vehicle.

As shown in FIG. 3, the wheel braking device 80 is a disk braking device which is one type of a friction braking device. Since the wheel braking device 80 has a known configuration, description thereof will be made briefly. The wheel braking device 80 includes a mounting bracket 90; a pair of brake pads 94 each of which includes a pad material 91 and a backup material 92 that backs up the pad material 91; and a caliper 98 which includes a wheel cylinder 96. The pair of the brake pads 94 serves as a friction sliding member. The brake pads 94 face each other so as to sandwich a disk rotor 100 which is a rotator that rotates integrally with the wheel. The mounting bracket 90 is fixed to a member which rotatably supports the wheel, and serves as a friction sliding member supporting member. The mounting bracket 90 supports the brake pads 94 such that the brake pads 94 can come close to or move away from the disk rotor 100. The caliper 98 includes two jaw portions 102 and 103. The jaw portions 102 and 103 are positioned so as to sandwich the disk rotor 100 and the brake pad 94. The mounting bracket 90 includes two rod-shaped guides 104. By inserting the guides 104 into two slide portions 106 of the caliper 98, respectively, the caliper 98 is slidably supported. The caliper 98 has the wheel cylinder device 96 (hereinafter, simply referred to as the "wheel cylinder 96" where appropriate) which serves as a pressing cylinder device (one type of a friction sliding member pressing device) in one of the two jaw portions 102 and 103. A part of the jaw portion 102 is used as a cylinder 108, and a piston 110 is slidably provided inside the cylinder 108. The cylinder 108 has a port 112 through which the operating fluid flows in the cylinder. Since the pressurized operating fluid flows into the cylinder through the port 112, the piston 110 moves forward, and the two brake pads 94 are pressed to the surface of the disc rotor 100 so as to sandwich the disk rotor 100, whereby a braking force is supplied.

The pump device 82 includes a pump 120 which pumps up the operating fluid from the reservoir 24 side and then discharges the operating fluid; an electric motor 122 which drives the pump 120; and an accumulator 124 which is provided on the discharge side of the pump 120. The pump device 82 is connected to the electromagnetic valve device 84 through a fluid passage 128. The pump pressure Pp, which is the hydraulic pressure of the operating fluid to be supplied by the pump device 82, is detected by a pump pressure sensor 126. A relief valve 130 is provided in the pump device 82. When the pressure in the discharge side of the pump 120 is excessively increased, the operating fluid is released to the reservoir 24 which is on the low pressure side.

The electromagnetic valve device 84 includes pressure increase control valves 140FL, 140FR, 140RL, and 140RR (hereinafter, simply referred to as a "pressure increase control valve 140" where appropriate) and pressure decrease control valves 142FL, 142FR, 142RL, and 142RR (hereinafter, simply referred to as a "pressure decrease control valve 142 where appropriate) which control the cylinder hydraulic pressure of each wheel cylinder 96, as the control valves corresponding to the wheels 40, respectively. Each pressure increase control valve 140 and its corresponding pressure decrease control valve 142, for example, the pressure increase control valve 140FL and the pressure decrease control valve 142FL constitute a pair of control valves which are connected to each other in series. The pairs of the control valves are provided in parallel so as to respectively correspond to the wheels. The inlet port of each pressure increase control valve 140 is connected to the fluid passage 128, and the outlet port of each pressure decrease control valve 142 is connected to a fluid passage 144 which communicates with the reservoir 24. The outlet port of each pressure increase control valve 140 and the inlet port of each pressure decrease control valve 142, which are connected to each other, are connected to a wheel cylinder 96 of each wheel 40 through the fluid passage. The pressure increase control valves 140 are normally closed linear valves. The pressure decrease control valves 142FR and 142FL are normally closed linear valves. However, the pressure decrease control valves 142RR and 142RL are normally open linear valves. Each of the pressure increase and decrease control valves has a configuration for generating pressures corresponding to the amounts of the exciting current on the inlet side and the outlet side. The pressures are different between the inlet side and the outlet side. By controlling currents to be supplied to the pressure increase control valves 140 and the pressure decrease control valves 142, a cylinder hydraulic pressure Pwc, that is, the hydraulic pressure of each wheel cylinder is controlled, and the braking force generated by each wheel braking device 80 becomes appropriate. The cylinder hydraulic pressure Pwc is detected by the cylinder hydraulic pressure sensors 146FL, 146FR, 146RL, and 146RR (hereinafter, simply referred to as a "cylinder hydraulic pressure sensor 146" where appropriate).

The control device 14 includes a brake electronic control unit 162 (hereinafter, simply referred to as a "brake ECU" 162 where appropriate) which is mainly constituted of a computer 160 provided with a CPU 150, RAM 152, ROM 154, an input/output interface 156, and a bus 158 which connects the CPU 150, the RAM 152, the ROM 154, the input/output interface 156 to each other, and the like. The brake ECU 162 includes a drive circuit 164 which drives the electric motor 122, and a control circuit 166 which controls the pressure increase control valves 140 and the pressure decrease control valves 142. The drive circuit 164 and the control circuit 166 are connected to the input/output interface 156 of the computer 160. Various sensors such as the master pressure sensor 54, the stroke sensor 56, the operation ON/OFF sensor 58, the pump pressure sensor 126, and the cylinder hydraulic pressure sensor 146 are connected to the input/output interface 156.

The braking device 10 is controlled when the computer 160 included in the control device 14 performs a predetermined brake control program stored in the ROM 154. As will be described later in detail, in the case where the brake is applied normally, when the electronic valve 34 is closed, the pump pressure Pp obtained by the pump device 82 is made higher than the hydraulic pressure required of each wheel cylinder 96, and the cylinder hydraulic pressure Pwc of each wheel cylinder 96 is controlled such that the braking force corresponding to the operation state of the brake pedal 20 is obtained by controlling the electronic valve device 84. By performing the above-mentioned brake control program, antilock (ABS) control, traction control (TRC), vehicle stability control (VSC), and the like can be also performed. When power supply is interrupted or the like, the electromagnetic valve 34 is open, the master pressure Pm generated due to the depressing force of the brake pedal 20 is directly supplied to the wheel braking device 80 of each of the front wheels 40FR, and 40FL, and the braking force is thus obtained.

Hereinafter, a target control value and hysteresis will be described. In the above-mentioned braking system, when the brake is applied normally, the cylinder hydraulic pressure Pwc of each wheel cylinder 96 is controlled so as to be equal to a value corresponding to the operation state of the brake pedal 20. Namely, the target cylinder hydraulic pressure Pwc* is decided, and control is performed such that the actual cylinder hydraulic pressure Pwc becomes equal to the target cylinder hydraulic pressure Pwc*. In the embodiment, before deciding the target cylinder hydraulic pressure Pwc*, the target vehicle deceleration G* corresponding to the operation state of the brake pedal 20 is decided, and the target cylinder hydraulic pressure Pwc* is decided based on the decided target vehicle deceleration G*. Namely, the target vehicle deceleration G* which is the first target control value is decided, and the target cylinder hydraulic pressure Pwc* which is the second target control value is decided based on the decided target vehicle deceleration G*.

Figure 4:
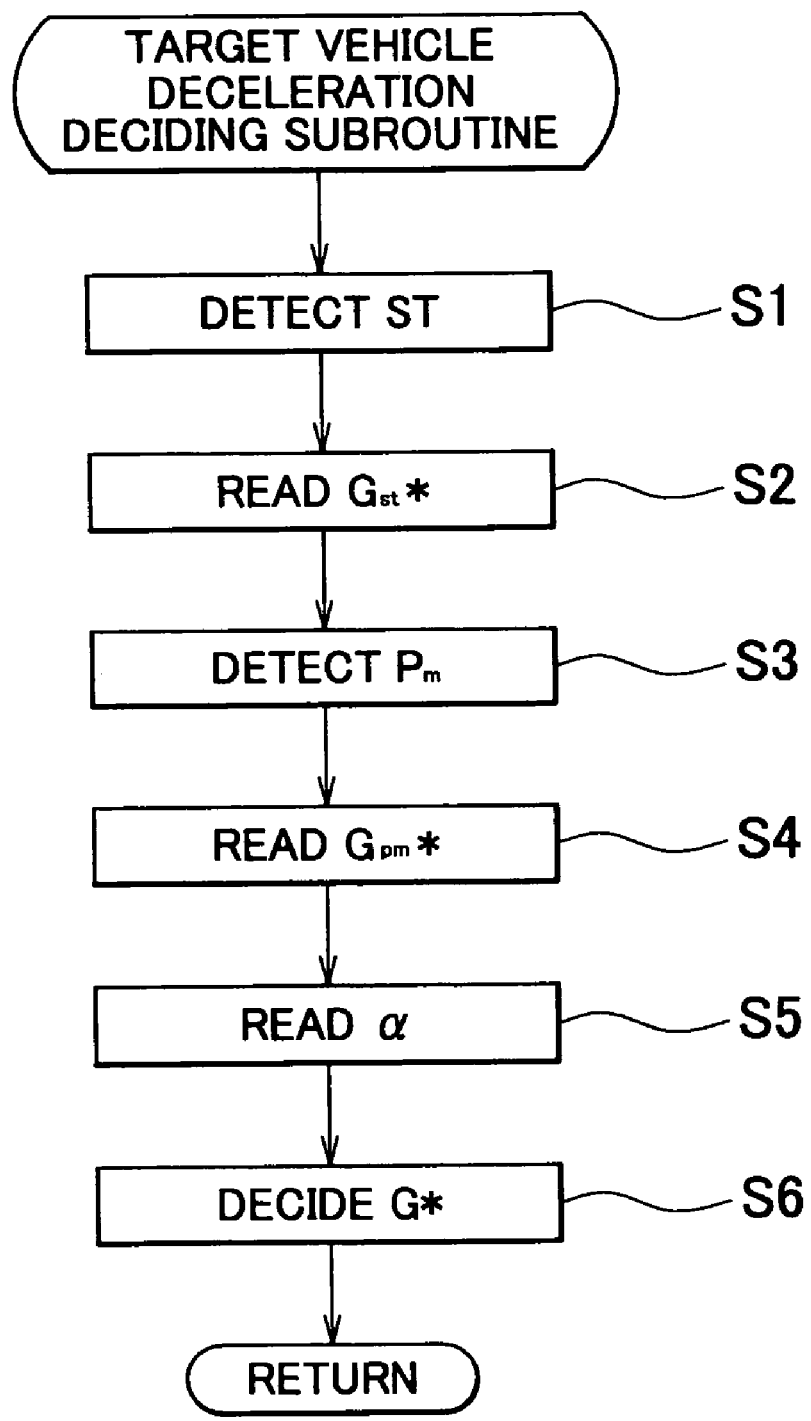
FIG. 4 is a flowchart of a target vehicle deceleration deciding subroutine which is performed in a control device provided in the braking system for a vehicle.
Figure 5:
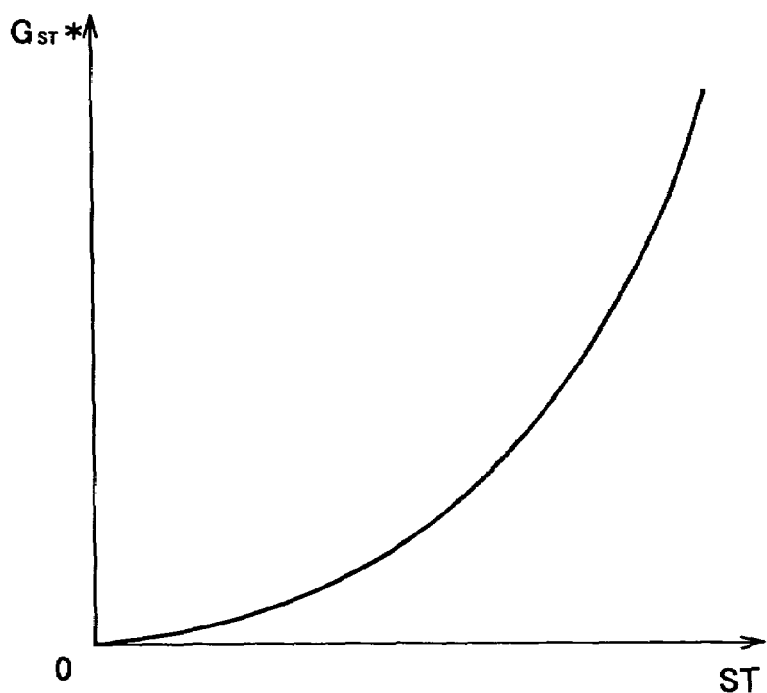
FIG. 5 is a graph schematically showing an ST-$G_{ST}$* map for obtaining a stroke corresponding target vehicle deceleration $G_{ST}$*.

The target vehicle deceleration G* is decided when the target vehicle deceleration deciding subroutine of the brake control program is performed as shown in FIG. 4. In the target vehicle deceleration deciding subroutine, the present pedal stroke ST of the brake pedal 20 is detected in Step 1 (hereinafter, simply referred to as "S1". The same is applied to the other steps). As will be described later, the pedal stroke ST has already been obtained as detection value obtained by the stroke sensor 56, and has already been stored in the RAM 152. The pedal stroke ST is one type of the operation state amounts of the operating member, and is used as the operation amount. The pedal stroke ST is "0" when the brake pedal is not depressed, and is increased with an increase in the depressing amount. In S2, the stroke corresponding target vehicle deceleration $G_{ST}^*$ which corresponds to the detected pedal stroke ST is read from the ST-$G_{ST}^*$ map stored in the ROM 154. In the embodiment, in the ST-$G_{ST}^*$ map, the inclination of the increase in the target vehicle deceleration $G_{ST}^*$ increases with an increase in the pedal stroke ST, as shown in FIG. 5.

Figure 6:
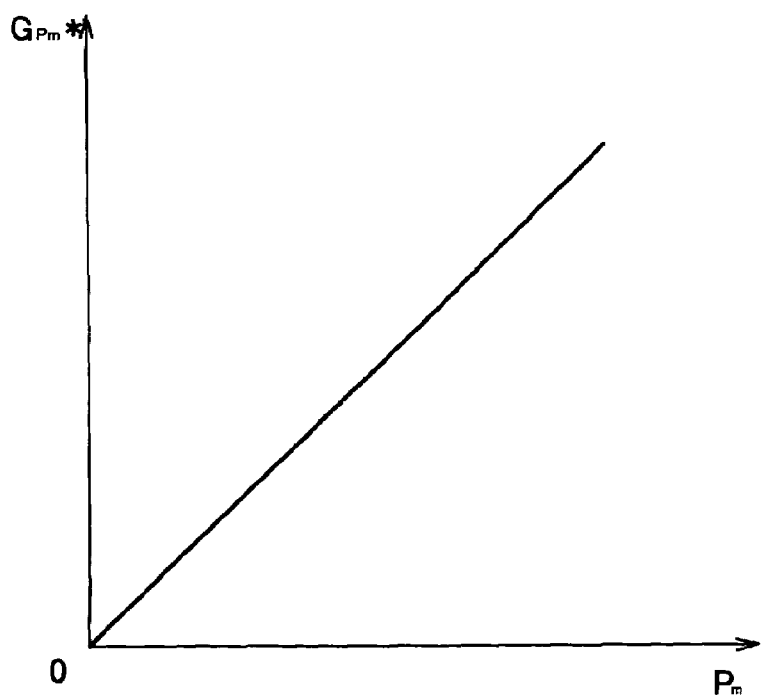
FIG. 6 is a graph schematically showing a Pm-$G_{pm}$* map for obtaining a master pressure corresponding target vehicle deceleration $G_{pm}$*.

Then, in S3, the master pressure Pm which is the present hydraulic pressure of the master cylinder 22 is detected. As in the case of the pedal stroke ST, the master pressure Pm has already been detected as the detection value obtained by the master pressure sensor 54, and has already been stored in the RAM152. The master pressure Pm is also one type of the operation state amounts of the operating member, and is used as the operating force related amount. The master pressure Pm is a relative pressure with the atmospheric pressure. The master pressure Pm is "0" when the brake pedal 20 is not depressed, and increases with an increase in the depressing amount. In step S4, the master pressure corresponding target vehicle deceleration $G_{pm}^*$ which corresponds to the detected master pressure Pm is read from the Pm-$G_{pm}^*$ map stored in the ROM 154. In the embodiment, in the Pm-$G_{pm}^*$ map, the target vehicle deceleration Gpm* increases substantially linearly with an increase in the master pressure Pm, as shown in FIG. 6.

Figure 7:
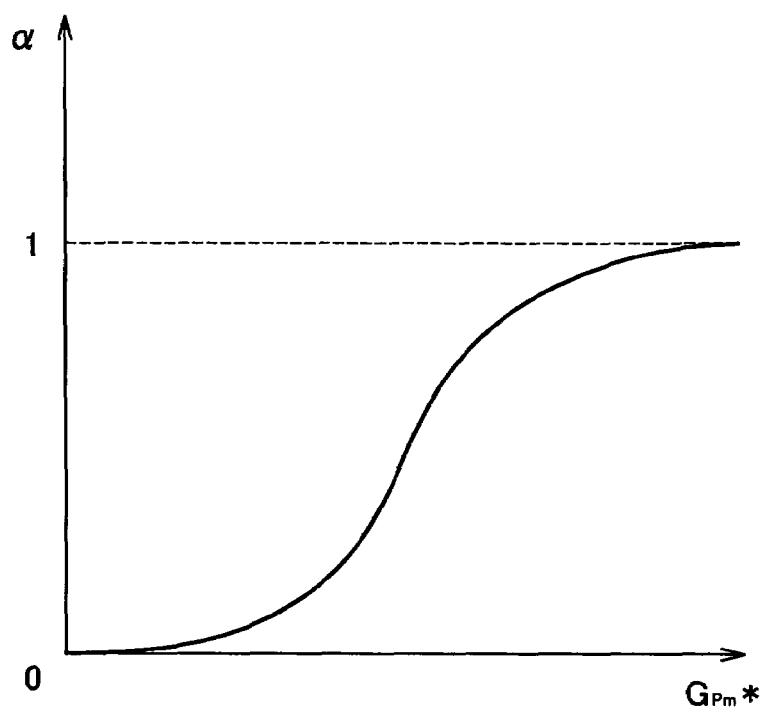
FIG. 7 is a graph schematically showing a weighting coefficient map for obtaining a weighting coefficient α for calculating a target vehicle deceleration G*.

In the embodiment, the target vehicle deceleration G* is decided as the weighting sum of $G_{ST}^*$ and $G_{pm}^*$. In S5, the weighting coefficient α is read from the weighting coefficient map stored in the ROM 154. As shown in FIG. 7, the weighting coefficient α is related to the master pressure corresponding vehicle target deceleration $G_{pm}^*$. The value of the weighting coefficient α corresponding to $G_{pm}^*$ read in S4 is read from the weighting coefficient map. In the embodiment, the weighting coefficient α is a value equal to or larger than "0" and also equal to or smaller than "1", and the value of the weighting coefficient α increases with an increased in $G_{pm}^*$. In S6, the target vehicle deceleration G* is obtained according to the following equation.

$$G^* = \alpha \times G_{pm}^* + (1-\alpha) \times G_{ST}^*$$

The operation of the brake pedal 20 can be classified into the depressing operation which is the operation in the braking force increasing direction, and the releasing operation which is the operation in the braking force decreasing direction. In the embodiment, in order to make the target control values in the depressing operation and the releasing operation different from each other, different maps are used in the depressing operation and the releasing operation when the target vehicle deceleration G* is decided. Two ST-$G_{ST}^*$ maps one of which is for depressing operation and the other of which is for releasing operation, two Pm-$G_{pm}^*$ maps one of which is for depressing operation and the other of which is for releasing operation, and two weighting coefficient maps one of which is for depressing operation and the other of which is for releasing operation are stored in the ROM 154, and are selected and used depending on the operating direction.

Figure 8:
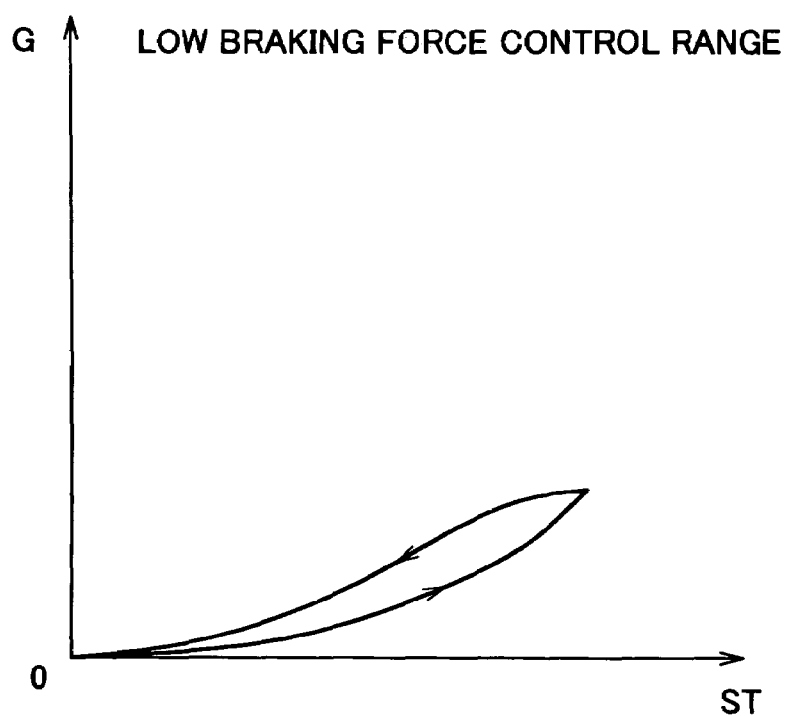
FIG. 8 is a graph schematically showing a relationship between an actual vehicle deceleration G and a pedal stroke ST in a low braking force control range, in the case where control is performed on the assumption that the target vehicle deceleration in the pedal depressing operation and the target vehicle deceleration in the pedal releasing operation are at the same value.

The following description will be made on the assumption that the target vehicle deceleration G* in the depressing operation and the target vehicle deceleration G* in the releasing operation are at the same value and the control is performed. FIG. 8 shows the relationship between the actual vehicle deceleration G and the pedal stroke ST in the low braking force control range. The graph in FIG. 8 shows the case where the depressing operation of the brake pedal 20 is performed until a predetermined depressing state is realized, and then the releasing operation is performed. In the low braking force control range, hysteresis shown in FIG. 8 is generated. It can be considered that the hysteresis is generated mainly due to the above-mentioned configuration of the wheel braking device 80, more particularly, due to the sliding resistance. As can be understood from FIG. 3, in the wheel braking device 80, sliding resistance is generated, for example, between the caliper 98 and the mounting bracket 90, between the brake pad 94 and the mounting bracket 90, and between the cylinder 108 of the caliper 98 and the piston 110. The sliding resistance is generated when the caliper 98 and the mounting bracket 90, the brake pad 94 and the mounting bracket 90, and the cylinder 108 and the piston 110 of the caliper 98 slide each other. Therefore, it is assumed that, even when the releasing operation of the brake pedal 20 is performed, the pressing force of the brake pad 94 to the disk rotor 100 is not easily reduced due to the sliding resistance, a so-called dragging phenomenon occurs, and the braking force in the releasing operating direction becomes higher than the braking force in the depressing operating direction even in the same operation state.

Figure 9:
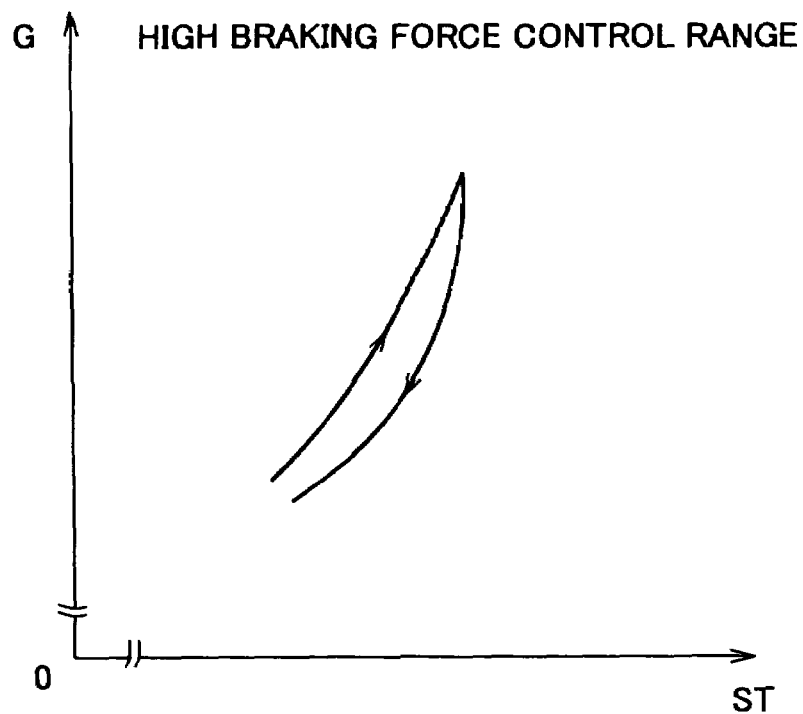
FIG. 9 is a graph schematically showing a relationship between the actual vehicle deceleration G and the pedal stroke ST in a high braking force control range, in the case where control is performed on the assumption that the target vehicle deceleration in the pedal depressing operation and the target vehicle deceleration in the pedal releasing operation are at the same value.

FIG. 9 shows the relationship between the actual vehicle deceleration G and the pedal stroke ST in the high braking force control range. The graph in FIG. 9 shows the case where the depressing operation of the brake pedal 20 is performed until a predetermined depressing state is realized, and then the releasing operation is performed. In the high braking force control range, hysteresis shown in FIG. 9 is generated. It can be considered that the hysteresis is generated mainly due to the configuration of the stroke simulator 26. As shown in FIG. 2, the stroke simulator 26 is configured such that the piston 62 slides inside the cylinder housing 60, and sliding resistance is generated between the cylinder housing 60 and the piston 62. The stroke simulator 26 and the master cylinder 22 are connected to each other through the fluid passage. The diameter of the fluid passage is smaller than the internal diameter of the cylinder housing 60. Therefore, fluid resistance for the backflow of the operating fluid is generated. Due to the resistance, the value of the master pressure Pm detected in the releasing operation is smaller than the detection value obtained in the depressing operation. As a result, the target vehicle deceleration G* is decreased, and the braking force in the releasing operating direction is also decreased.

Figure 10:
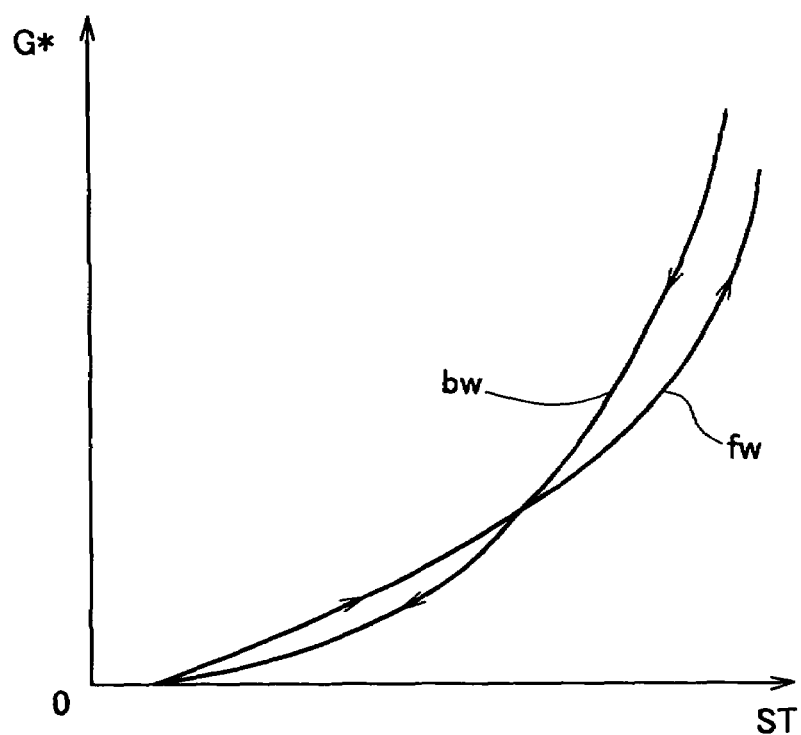
FIG. 10 is a graph schematically showing the case where the target vehicle deceleration G* varies depending on the operating direction of the brake pedal.

Such hysteresis is a phenomenon specific to the hydraulic braking device, and is a cause of deterioration of the operating feeling felt by the driver. Therefore, in the embodiment, in order to suppress such hysteresis, the target vehicle deceleration G* is set to different values depending on the operating direction of the brake pedal 20. More particularly, even in the same operation state, the increasing direction target control value in the depressing direction, that is, the braking force increasing direction, and the decreasing direction target control value in the releasing direction, that is, the braking force decreasing direction are set to different values. More particularly, the target vehicle deceleration G* is decided as schematically shown in FIG. 10. In FIG. 10, the line fw is the target vehicle deceleration line in the depressing direction, and the line bw is the target vehicle deceleration line in the releasing direction. As can be understood from FIG. 10, in the low braking force control range, the target vehicle deceleration G* in the releasing operation is smaller than the target vehicle deceleration G* in the depressing operation, and the decreasing direction target control value is set to a value lower than the increasing direction target control value. In the high braking force control range, the target vehicle deceleration G* in the releasing operation is higher than the target vehicle deceleration G* in the depressing operation, and the decreasing direction target control value is set to a value higher than the increasing direction target control value. An example of the map is not shown. Setting an appropriate map realizes the relationships between the operation state amount and the target control value, which are different from each other depending on the operating direction, as shown in FIG. 10. In FIG. 10, the pedal stroke ST is used as the horizontal axis. However, FIG. 10 is used for the sake of expediency, in order to facilitate understanding of the form of the target control value in the embodiment. As can be understood from the above-mentioned process, in actuality, the target vehicle deceleration G* is not decided only based on the pedal stroke ST.

Figure 11:
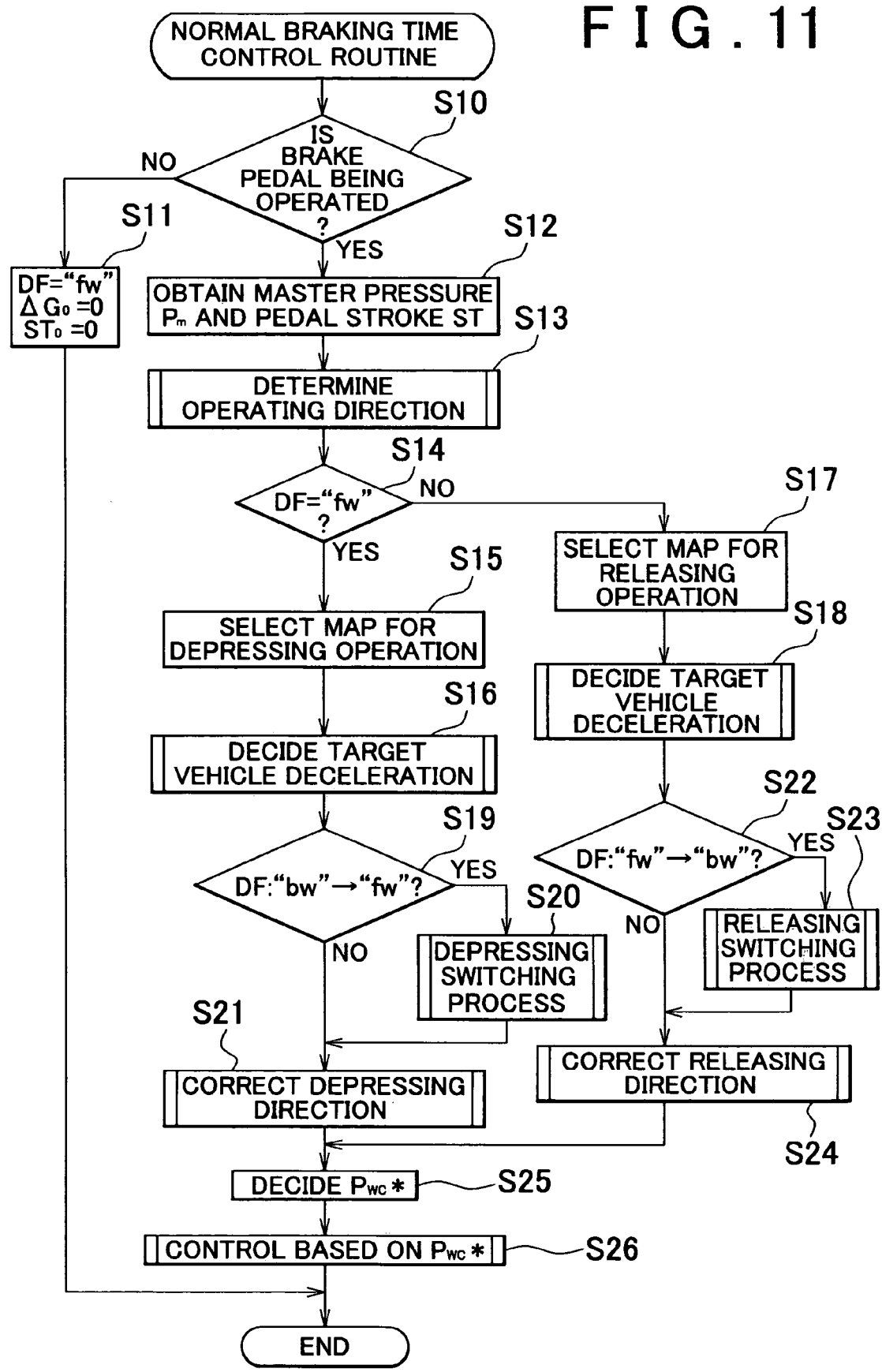
FIG. 11 is a flowchart of a control routine when the brake is applied normally (hereinafter, referred to as a "normal braking time control routine"), among brake control programs of the braking system for a vehicle.

Hereafter, control of braking system for a vehicle will be described. Control in the embodiment will be described on the assumption that the target vehicle deceleration is decided in the above-mentioned manner. In order to simplify the description, only the description related to the control when the brake is applied normally will be made. FIG. 11 shows the flowchart of the normal braking time control routine which is extracted from the above-mentioned brake control program. Hereafter, description will be made with reference to the flowchart. The normal braking time control routine is repeatedly performed at a short cycle of several msec while the ignition switch of the vehicle is in the ON state.

In S10, it is determined whether the brake pedal 20 is being operated. More particularly, the determination is made using the detection value obtained by the operation ON/OFF sensor 58. When it is determined that the brake pedal 20 is in the operation OFF state, an operating direction flag DF is set to "fw" ("fw" shows that the operating direction is the depressing direction), and the values of the operating direction switching time target vehicle deceleration gap $\Delta G_0$ (hereinafter, simply referred to as the "switching time gap $\Delta G_0$ where appropriate) and the operating direction switching time stroke $ST_0$ (hereinafter, simply referred to as the "switching time stroke $ST_0$" where appropriate) are reset to "0" in S11. The switching time gap $\Delta G_0$ and the switching time stroke $ST_0$ will be described later in detail. When it is determined that the brake pedal 20 is in the operation ON state in S10, the master pressure Pm which is the detection value obtained by the master pressure sensor 54, and the pedal stroke ST which is the detection value obtained by the stroke sensor 56 are obtained in S12.

Figure 12:
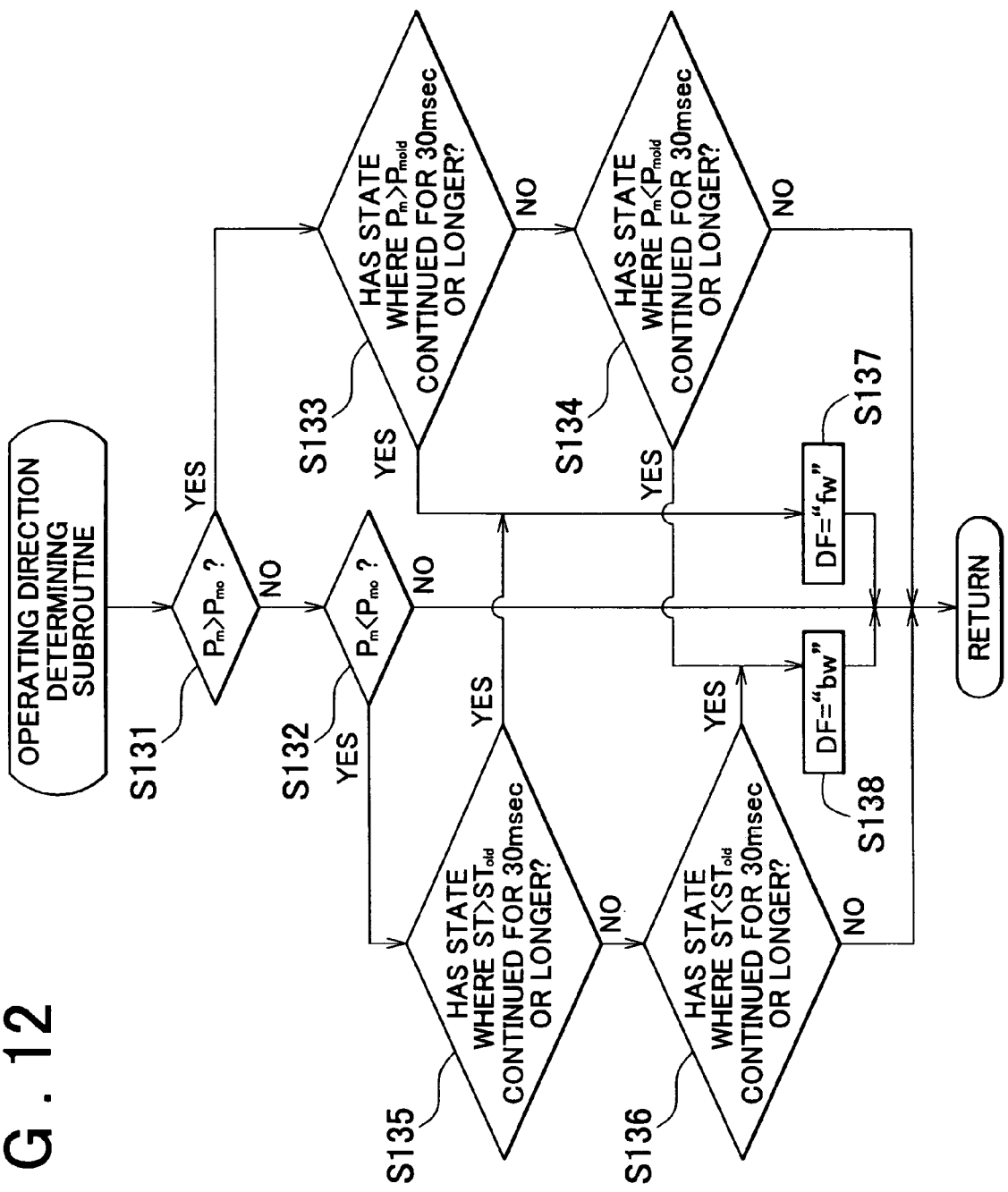
FIG. 12 is a flowchart of an operating direction determining subroutine which is performed in the normal braking time control routine.

Then, the operating direction determining subroutine in S13 shown in the flowchart in FIG. 12 is performed. In S13, the operation state amount for determining the operating direction is changed according to the braking force. When the braking force is low, the operating direction is determined based on the state of change in the pedal stroke ST. When the braking force is high, the operating direction is determined based on the state of change in the master pressure Pm. More particularly, when it is determined that the master pressure Pm is higher than the change master pressure $Pm_0$ which is the threshold value for changing the master pressure Pm (for example, a value of 0.15 MPa), S133 and following steps are performed. When it is determined that the master pressure Pm is lower than the change master pressure $Pm_0$, S135 and following steps are performed.

In S133 and S134, the operating direction of the brake pedal 20 is determined based on the state of change in the master pressure Pm. The previous master pressure $Pm_{old}$, which is the master pressure when the previous routine is performed, is stored in the RAM152, and the operating direction of the brake pedal 20 is determined by comparing the previous master pressure $Pm_{old}$ with the master pressure Pm. Also, a predetermined number of previous master pressures up to the second to the last master pressure, which are obtained when the routine is performed second-previously and before, are stored in the RAM 152, and the operating direction of the brake pedal 20 is determined also based on the change with time within a predetermined period. More particularly, in S133, when the state where the master pressure Pm is higher than the previous master pressure $Pm_{old}$ continues for 30 msec, it is determined that the present operating direction of the brake pedal 20 is the depressing direction. In S134, when the state where the master pressure Pm is lower than the previous master pressure $Pm_{mold}$ continues for 30 msec, it is determined that the present operating direction of the brake pedal 20 is the releasing direction.

In S135 and S136, the operating direction of the brake pedal 20 is determined based on the state of change in the pedal stroke ST. The previous pedal stroke $ST_{old}$, which is the pedal stroke when the previous routine is performed, is stored in the RAM 152, and the operating direction of the brake pedal 20 is determined by comparing the previous pedal stroke $ST_{old}$ with the present pedal stroke ST. Also, a predetermined number of previous pedal strokes up to the second to the last pedal stroke, which are obtained when the routine is performed second-previously and before, are stored in the RAM 152, and the operating direction of the brake pedal 20 is determined also based on the change with time within a predetermined period. More particularly, in S135, when the state where the pedal stroke ST is larger than the previous pedal stroke $ST_{old}$ continues for 30 msec, it is determined that the present operating direction of the brake pedal 20 is the depressing direction. In S136, when the state where the pedal stroke ST is smaller than the previous pedal stroke $ST_{old}$ continues for 30 msec, it is determined that the present operating direction is the releasing direction.

When it is determined that the operating direction flag DF is "fw" and the operating direction of the brake pedal 20 is the releasing direction in S137, the operating direction flag DF is "bw" ("bw" shows the releasing direction) in S138, and the operating direction determining subroutine ends. When affirmative determinations are not made in any of the steps S131 to S136, the subroutine ends while the operating direction flag DF maintains the previous value.

The operating direction flag DF is referred to and the present operating direction of the brake pedal 20 is checked in S14, after the subroutine in S13 ends. As a result of the check, when it is determined that the present operating direction is the depressing direction, the map in the depressing operation is selected as the three maps, that are, the ST-$G_{ST}$* map, the Pm-$G_{pm}$* map, and the weighting coefficient map in S15. Then, in S16, the target vehicle deceleration G* as the increasing direction target control value is decided using the selected map according to the above-mentioned target vehicle deceleration deciding subroutine. When it is determined that the operating direction of the brake pedal 20 is the releasing direction in S14, the map for the releasing operation is selected in S17, and the target vehicle deceleration G* as the decreasing direction target control value is decided using the selected map according to the target vehicle deceleration deciding subroutine in S18.

In the braking system according to the embodiment, the target vehicle decelerations G* are set to the values different from each other depending on the operating direction even in the same operation state mount. Therefore, the target vehicle deceleration G* may rapidly changes in step when the operating direction of the brake pedal 20 is changed. Namely, there is a possibility that the control value difference, which is the difference between the increasing direction target control value and the decreasing direction target control value, that is, a gap occurs. Therefore, in the system in the embodiment, in order to prevent the gap and to reduce the rapid change, the decided target vehicle deceleration G* is corrected. In steps S19 to S21 correction in the depressing direction is performed, and in steps S22 to S24 correction in the releasing direction is performed.

Figure 13:
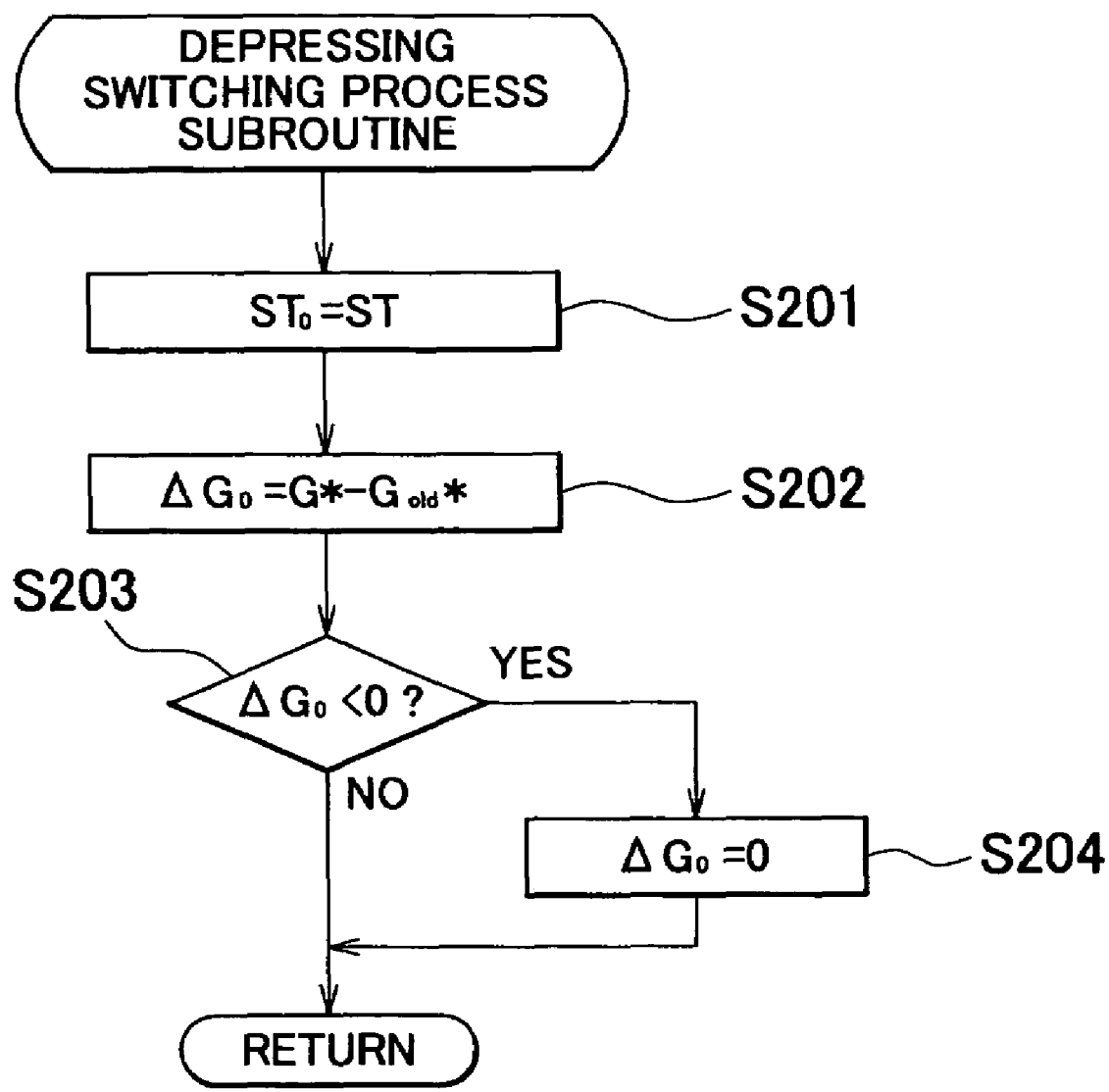
FIG. 13 is a flowchart of a depressing switching process subroutine which is performed in the normal braking time control routine.

Correction in the depressing direction will be described. In S19, it is determined whether the operating direction of the brake pedal 20 is switched from the releasing direction to the depressing direction in the present control cycle. The value of the previous operating direction flag $DF_{old}$ is stored in the RAM152, and determination is made based on the comparison of the present operation direction flag DF and the previous operation direction flag $DF_{old}$. When it is determined that the operating direction is switched to the depressing direction in the present cycle, the depressing switching process subroutine shown in S20 in the flowchart in FIG. 13 is performed. In the subroutine, the present pedal stroke ST of the brake pedal 20 is set to the switching time stroke $ST_0$ in S201. Then, the switching time gap $\Delta G_0$ is obtained in S202. The previous vehicle deceleration $G_{old}^*$, which is the target vehicle deceleration in the previous cycle, is stored in the RAM152. The switching time gap $\Delta G_0$ is obtained by subtracting the previous vehicle deceleration $G_{old}^*$ from the vehicle deceleration G* which is decided in the present cycle. Then, it is determined whether the switching time gap $\Delta G_0$ is smaller or larger than "0" in S203. In the embodiment, as can be understood from FIG. 10, the vehicle deceleration G* in the releasing operation is smaller than the vehicle deceleration G* in the depressing operation in the low braking force control range. Accordingly, the possibility that the switching time gap $\Delta G_0$ is larger than "0" is higher than the possibility that the switching time gap $\Delta G_0$ is smaller than "0". On the other hand, the vehicle deceleration G* in the depressing operation is smaller than the vehicle deceleration G* in the releasing operation in the high braking force control range. Accordingly, the possibility that the switching time gap $\Delta G_0$ is smaller than "0" is higher than the possibility that the switching time gap $\Delta G_0$ is larger than "0". In the embodiment, the methods of correction are different from each other according to whether the switching time gap $\Delta G_0$ is larger or smaller than "0", and the correction value is decided based on the value of the switching time gap $\Delta G_0$. Therefore, for the sake of convenience, when the switching time gap $\Delta G_0$ is smaller than "0", the process for making the switching time gap $\Delta G_0$ substantially equal to "0" is performed in S204.

Figure 14:
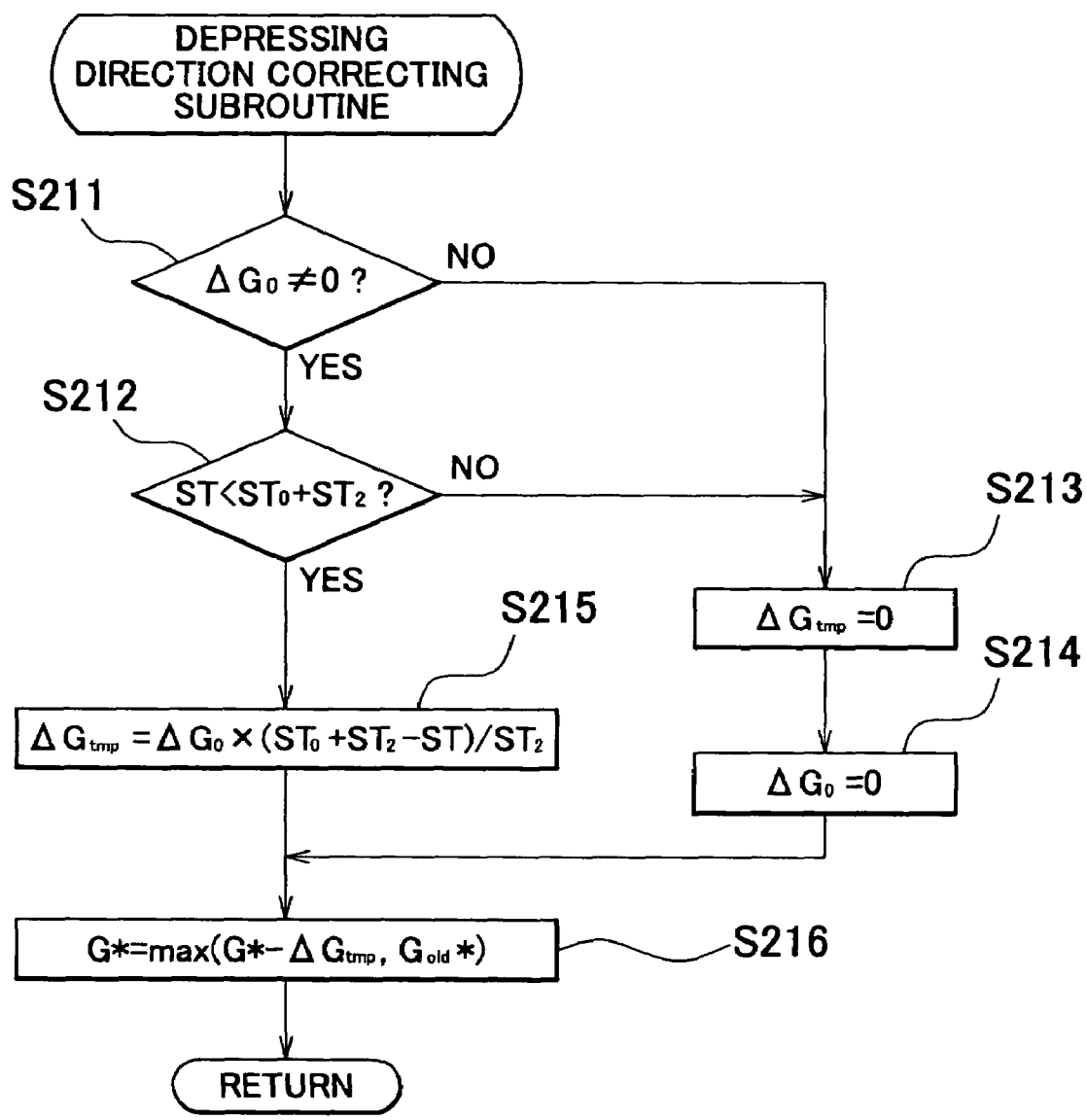
FIG. 14 is a flowchart of a depressing direction correcting subroutine which is performed in the normal braking time control routine.

After the depressing switching process subroutine is performed, or when the operating direction is not switched, the depressing direction correcting subroutine in S21 shown in the flowchart in FIG. 14 is performed. In the subroutine, it is initially determined whether the switching time gap $\Delta G_0$ is "0" in S211, and it is determined whether the present pedal stroke ST is in the correction operation range whose end point is obtained by adding the predetermined stroke $ST_2$ to the switching time stroke $ST_0$. $ST_2$ is the correction operation range defining amount which uses the pedal stroke as a parameter (for example, a value such as 15 mm can be employed). When the switching time gap $\Delta G_0$ is "0" or substantially equal to "0", or when the pedal stroke ST is not in the correction operation range, the gradual decrease correction value $\Delta G_{tmp}$, which will be described later in detail, is set to "0" in S213, and the switching time gap $\Delta G_0$ is set to "0" in S214.

When it is determined that the switching time gap $\Delta G_0$ is not "0", and also the pedal stroke ST is in the correction operation range, the gradual decrease correction value $\Delta G_{tmp}$ is decided according to the equation of "$\Delta G_{tmp} = \Delta G_0 \times (ST_0 + ST_2 - ST)/ST_2$" in S215. The gradual decrease correction value $\Delta G_{tmp}$ obtained according to the equation is the value which gradually decreases as the depressing operation proceeds, and is used as the correction value for performing correction for gradually decreasing the switching time gap $\Delta G_0$ according to the operation state in the correction operation range.

After the gradual decrease correction value $\Delta G_{tmp}$ is decided, the target vehicle deceleration G* which has already been decided is corrected in S216. More particularly, the value of "$G^* - \Delta G_{tmp}$" and the previous target vehicle deceleration $G_{old}^*$ are compared with each other, and the larger value obtained by the comparison is decided again as the target vehicle deceleration G*. When these processes are completed, the depressing direction correcting subroutine ends.

Figure 15:
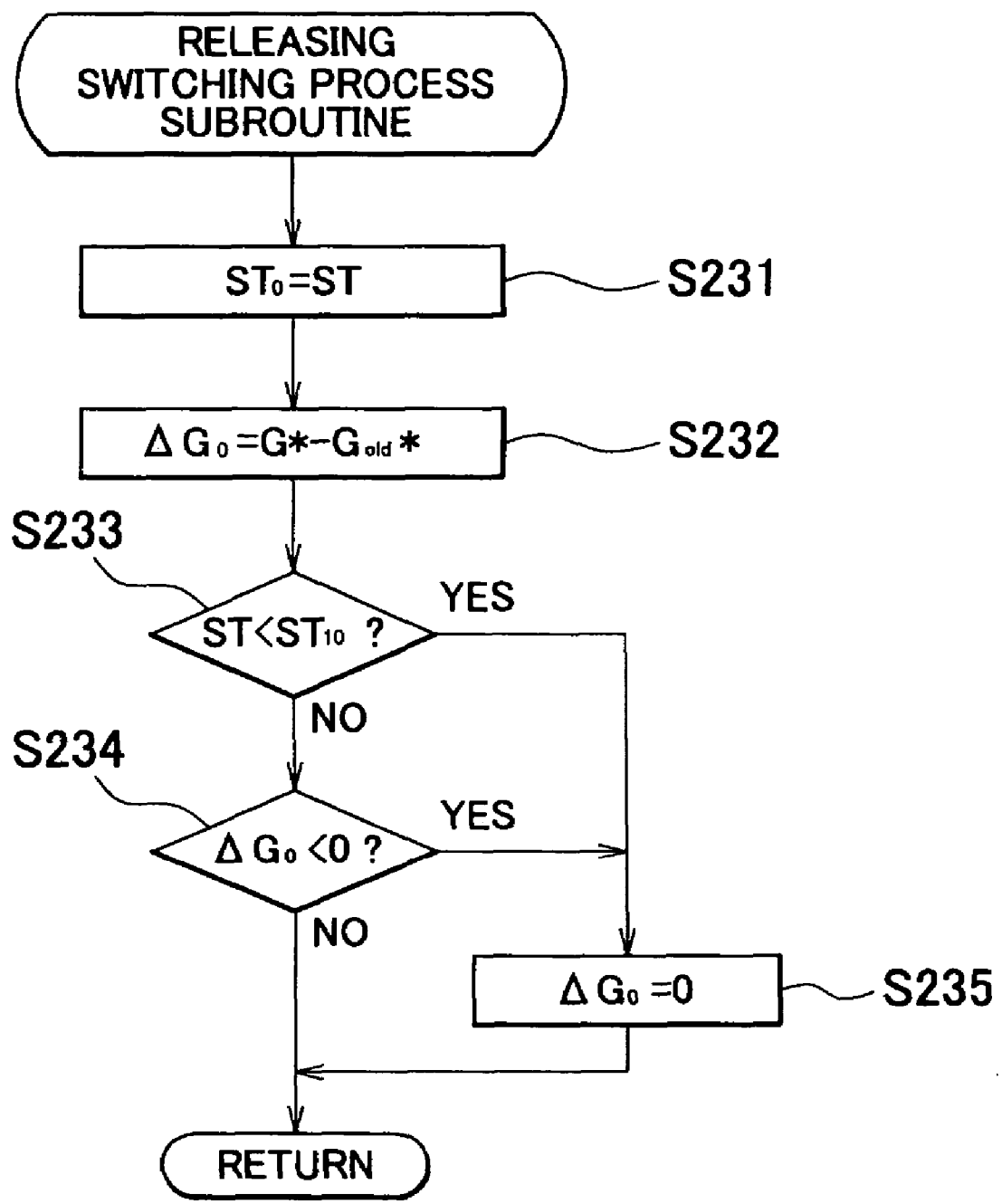
FIG. 15 is a flowchart of a releasing switching process subroutine which is performed in the normal braking time control routine.

Next, correction in the releasing direction will be described. Initially, it is determined whether the operating direction is switched from the depressing direction to the releasing direction in the present control cycle by comparing the operating direction flag DF and the previous operating direction flag $DF_{old}$ with each other in S22. When it is determined that the operating direction is switched to the releasing direction in the present cycle, the releasing switching process subroutine in S23 shown in the flowchart in FIG. 15 is performed. In the subroutine, as in the case of the depressing switching process subroutine in S20, the pedal stroke ST is set to the switching time stroke $ST_0$ in S231. Then, the switching time gap $\Delta G_0$ is obtained in S232. In S233, it is determined whether the pedal stroke ST is smaller than the predetermined value $ST_{10}$. As will be described later in detail, correction in the low braking force control range is performed during the period from when the operating direction is switched until when the target vehicle deceleration G* becomes substantially equal to "0". Therefore, the correction end point stroke $ST_1$ is set as the end point of the correction operation range. More particularly, the pedal stroke ST, at which the vehicle deceleration G* that is decided using the map in the depressing direction becomes substantially equal to "0", is made $ST_1$ (for example, a value of 4 mm). The pedal stroke shown by $ST_{10}$ is set to a value which is slightly larger than $ST_1$ (for example, a value of 4.1 mm) such that the pedal stroke shown by $ST_{10}$ is prohibited from being divided by "0" in the equation in the following steps. Next, it is determined whether the switching time gap $\Delta G_0$ is larger or smaller than "0". As described in the case where the operating direction is switched to the depressing direction, in the case where the operating direction is switched to the releasing direction, the methods of correction are made different from each other according to whether the switching time gap $\Delta G_0$ is larger or smaller than "0". The determination in S234 is made in order to perform this. When it is determined that the pedal stroke ST is smaller than $ST_{10}$ in S233, or when it is determined that the switching time gap $\Delta G_0$ is smaller than "0" in S234, the process for making the switching gap $\Delta G_0$ substantially equal to "0" is performed for the sake of convenience.

Figure 16:
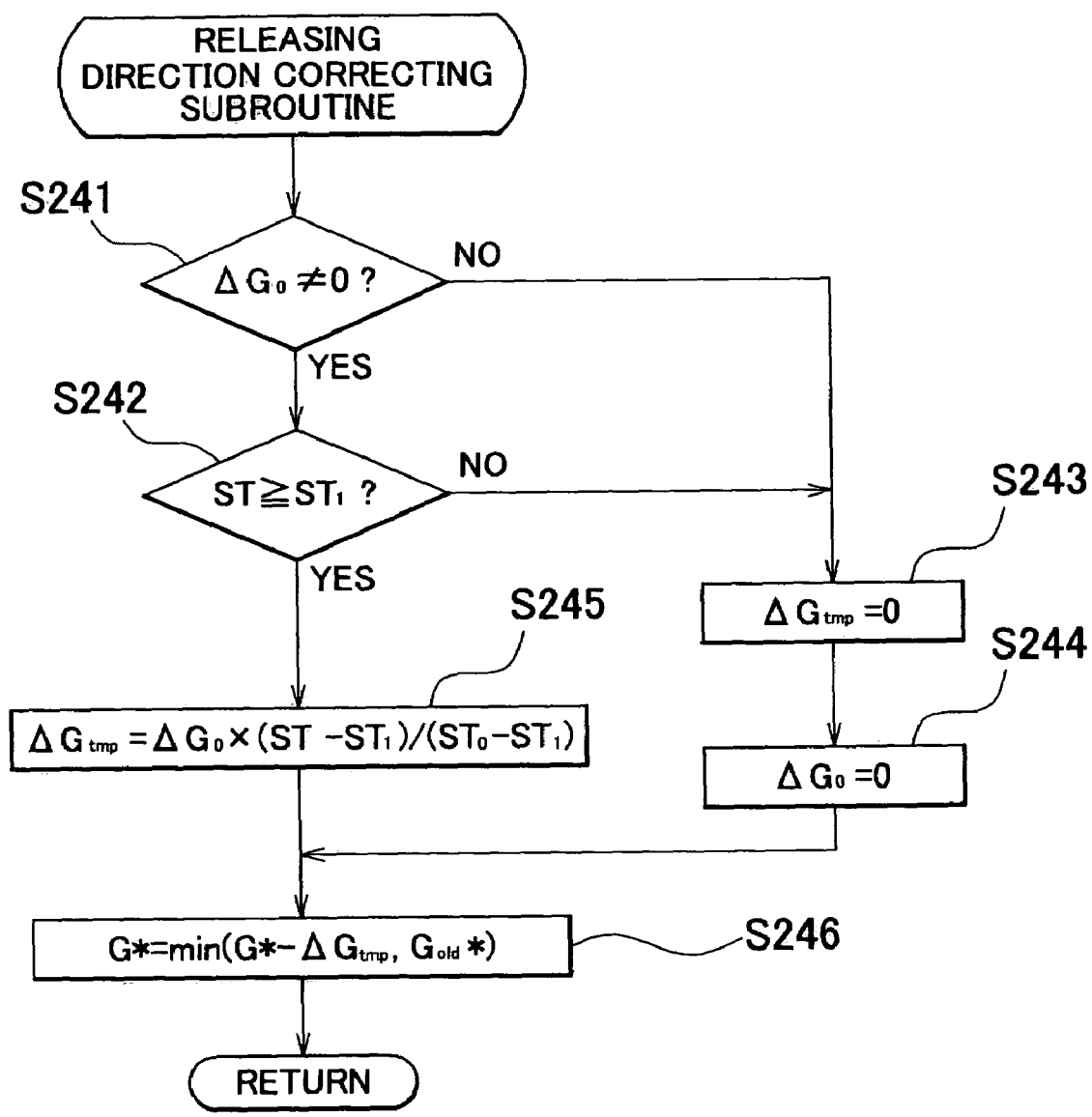
FIG. 16 is a flowchart of a releasing direction correcting subroutine which is performed in the normal braking time control routine.

After the releasing switching process subroutine is performed, or when the operating direction is not switched, the releasing direction correcting subroutine in S24 shown in the flowchart in FIG. 16 is performed. In the subroutine, it is initially determined whether the switching time gap $\Delta G_0$ is "0" in S241. In S242, it is determined whether the present pedal stroke ST is larger than the correction end point stroke $ST_1$ which is the end point of the above-mentioned correction operation range. When the switching time gap $\Delta G_0$ is "0" or is substantially equal to "0", or when it is determined that the present pedal stroke ST is not in the correction operation range, as in the case of correction in the depressing direction, the gradual decrease correction value $\Delta G_{tmp}$ in the present cycle is set to "0" in S243, and the switching time gap $\Delta G_0$ is set to "0" in S244.

As a result of the determination made in S241 and S242, when it is determined that the switching time gap $\Delta G_0$ is not "0" and also the present pedal stroke ST is in the correction operation range, the gradual decrease correction value $\Delta G_{tmp}$ is decided according to the equation of "$\Delta G_{tmp}=\Delta G_0 \times (ST-ST_1)/(ST_0-ST_1)$" in S245. The gradual decrease correction value $\Delta G_{tmp}$ according to the equation, as in the case of correction in the depressing direction, is the value which gradually decreases as the releasing operation proceeds, and is used as the correction value for gradually decreasing the switching time gap $\Delta G_0$ according to the operation state in the correction operation range.

After the gradual decrease correction value $\Delta G_{tmp}$ is decided, the target vehicle deceleration G* which has already been decided is corrected in S246. More particularly, unlike the correction in the depressing direction, the value of "G*-$\Delta G_{tmp}$" and the previous target vehicle deceleration $G_{old}$* are compared with each other, and the smaller value obtained by the comparison is decided again as the target vehicle deceleration G*. When the above-mentioned processes are completed, the releasing direction correcting subroutine ends.

Figure 17A:
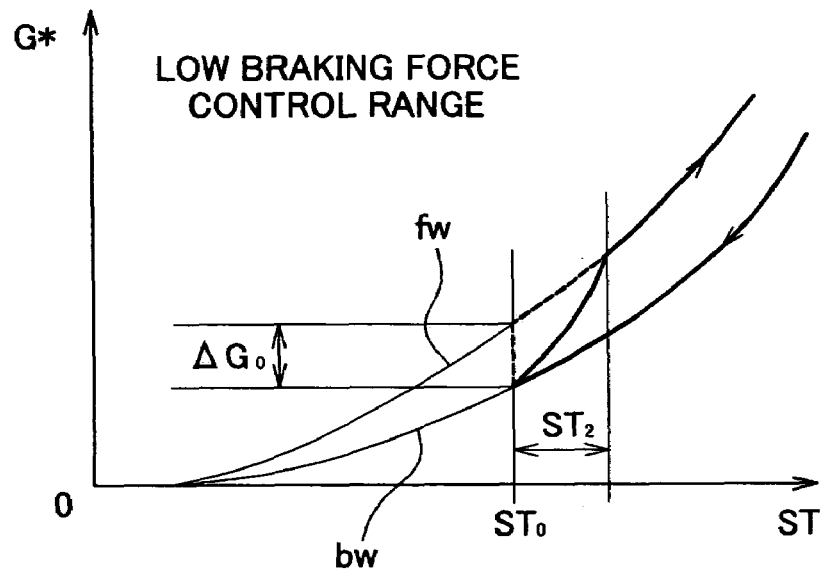
FIG. 17A is a graph schematically showing a change in the target vehicle deceleration G* in the low braking force control range, which is obtained according to the result of the correcting process, in the case where the operating direction is switched to the depressing direction.
Figure 17B:
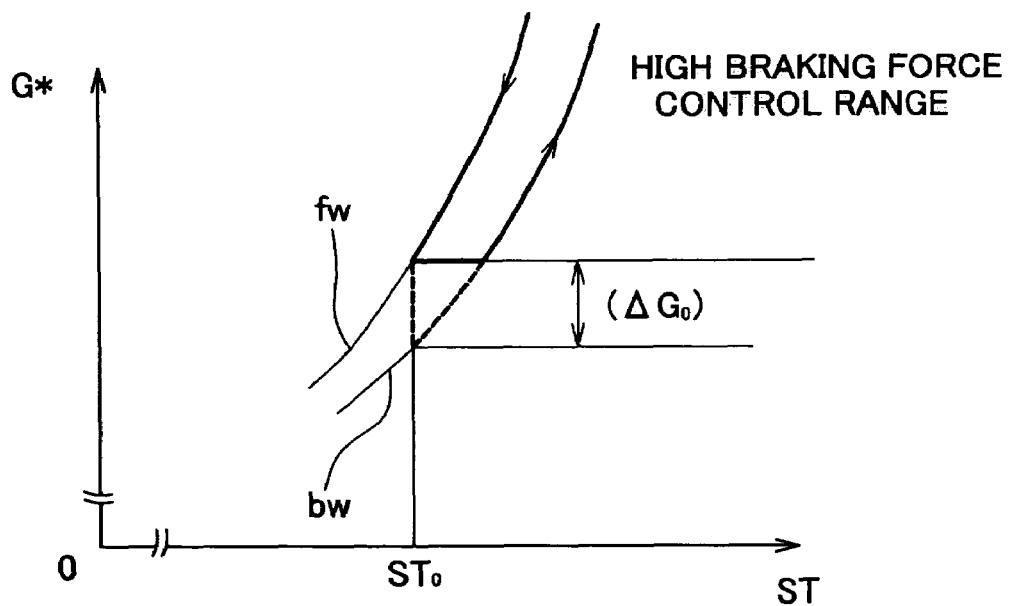
FIG. 17B is a graph schematically showing a change in the target vehicle deceleration G* in the high braking force control range, which is obtained according to the result of the correcting process, in the case where the operating direction is switched to the depressing direction.

The process related to correction has been described so far. In order to facilitate understanding, description will be made using concrete examples. FIG. 17A and FIG. 17B schematically show the change in the actual target vehicle deceleration G* which is obtained as the result of the correction, in the case where the operating direction is switched to the depressing direction. FIG. 17A shows the change in the low braking force control range, and FIG. 17B shows the change in the high braking force control range.

The change in the low braking force control range shown in FIG. 17A will be described. In the case where correction is not performed, when the operating direction is switched to the depressing direction at the switching time stroke $ST_0$, the target vehicle deceleration G* changes as shown by the heavy dashed line. When the correction process is performed, the depressing switching process subroutine in S20 is performed in the control cycle which is being performed when the operating direction is switched. Since the switching time gap $\Delta G_0$ is equal to or larger than "0", the switching time gap $\Delta G_0$ is set as it is. In the depressing direction correcting subroutine in S21, the gradual decrease correction value $\Delta G_{tmp}$ is computed in S215, and the target vehicle deceleration G* is corrected so as to be the value of "G*-$\Delta G_{tmp}$" in S216. During several control cycles after this correction, S215 and S216 are repeatedly performed, and correction is performed while the gradual decrease correction value $\Delta G_{tmp}$ is gradually decreased until the pedal stroke ST becomes equal to the value of "$ST_0+ST_2$". After the pedal stroke ST becomes equal to the value of "$ST_0+ST_2$", correction is not performed. Namely, as a result of such correction, as shown by the heavy solid line in the figure, the target vehicle deceleration G* is corrected in the state where the switching time gap $\Delta G_0$ is gradually decreased according to the operation state of the brake pedal 20.

The change in the high braking force control range shown in FIG. 17B will be described. In the case where correction is not performed, when the operating direction is switched to the depressing direction at the switching time stroke $ST_0$, the target vehicle deceleration G* changes as shown by the heavy dashed line. When the correction process is performed, the depressing switching process subroutine in S20 is initially performed in the control cycle which is being performed when the operating direction is switched. Since the switching time gap $\Delta G_0$ is smaller than "0", the switching time gap $\Delta G_0$ is substantially equal to "0". In the depressing direction correcting subroutine in S21, computation of the gradual correction value $\Delta G_{tmp}$ in S215 is skipped, and the target vehicle deceleration G* is corrected so as to be the previous target vehicle deceleration $G_{old}$* in S216. In the several control cycles after this correction, the target vehicle deceleration G* is maintained at the value of the previous target vehicle deceleration $G_{old}$*. When the target vehicle deceleration G* become substantially equal to the previous target vehicle deceleration $G_{old}$*, correction ends. Namely, as a result of such correction, as shown in the figure by the heavy solid line, the target vehicle deceleration G* is corrected such that the value immediately before switching the operating direction is maintained in the operation range.

Figure 18A:
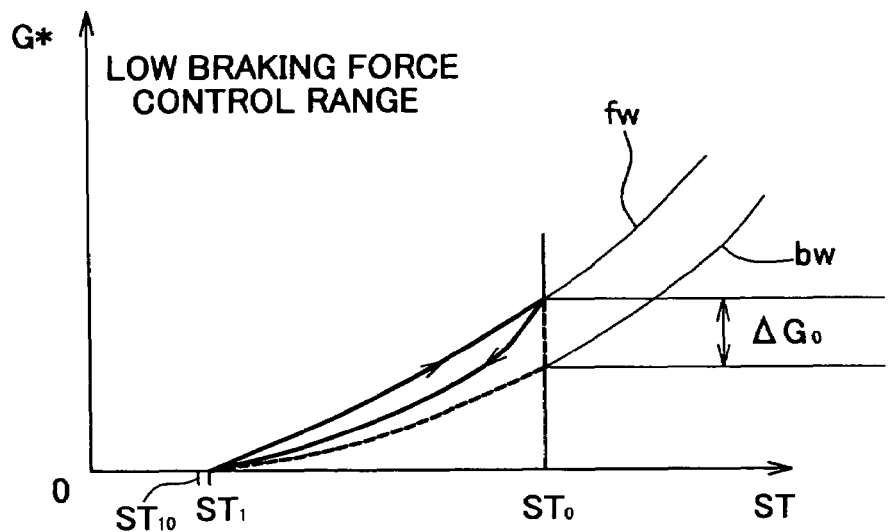
FIG. 18A is a graph schematically showing a change in the target vehicle deceleration G* in the low braking force control range, which is obtained according to the result of the correcting process, in the case where the operating direction is switched to the releasing direction.
Figure 18B:
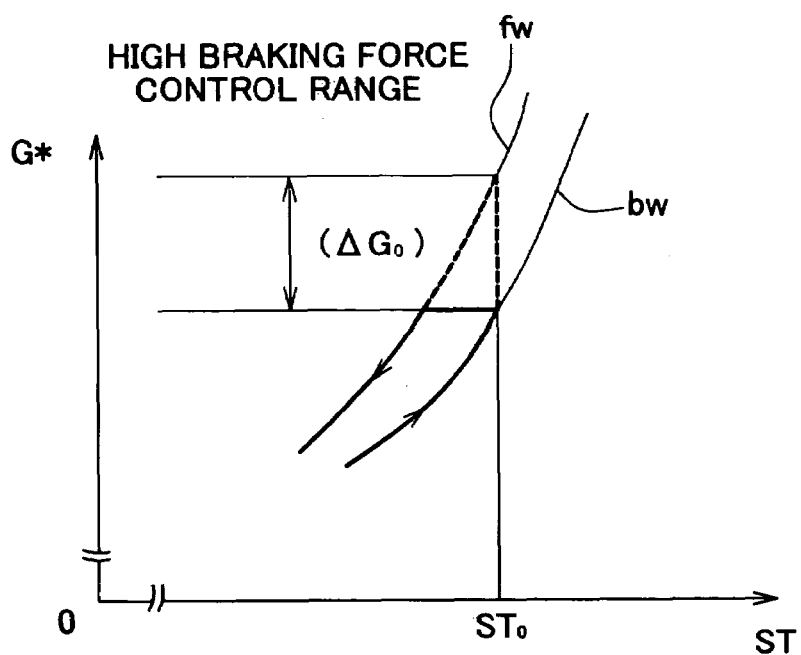
FIG. 18B is a graph schematically showing a change in the target vehicle deceleration G* in the high braking force control range, which is obtained according to the result of the correcting process, in the case where the operating direction is switched to the releasing direction.

FIG. 18A and FIG. 18B schematically show the change in the actual target vehicle deceleration G* obtained as a result of the correction when the operating direction is switched to the depressing direction.

The change in the low braking force control range shown in FIG. 18A will be described. In the case where correction is not performed, when the operating direction is switched to the releasing direction at the switching time stroke $ST_0$, the target vehicle deceleration G* changes as shown by the heavy dashed line. When the correction process is performed, the releasing switching process subroutine in S23 is performed in the control cycle which is being performed when the operating direction is switched. Since the switching time gap $\Delta G_0$ is equal to or smaller than "0", the switching time gap $\Delta G_0$ is set as it is. In the releasing direction correcting subroutine in S24, the gradual decrease correction value $\Delta G_{tmp}$ is computed in S245, and the target vehicle deceleration G* is corrected so as to be the value of "G*-$\Delta G_{tmp}$" in S246. In the several cycles after this correction, S215 and S126 are repeatedly performed, and correction is performed while the gradual decrease correction value $\Delta G_{tmp}$ is gradually decreased until the pedal stroke ST becomes equal to $ST_1$. When the pedal stroke ST becomes smaller than $ST_1$, correction is not performed. Namely, as a result of such correction, as shown by the heavy solid line in the figure, the target vehicle deceleration G* is corrected in the state where the switching time gap $\Delta G_0$ is gradually decreased according to the operation state of the brake pedal 20 in the predetermined operation range.

The change in the high braking force control range shown in FIG. 18B will be described. In the case where correction is not performed, when the operating direction is switched to the releasing direction at the switching time stroke $ST_0$, the target vehicle deceleration $G^*$ changes as shown by the heavy dashed line. When the correction process is performed, the releasing switching process subroutine in S23 is performed in the control cycle which is being performed when the operating direction is switched. Since the switching time gap $\Delta G_0$ is larger than "0", the switching time gap $\Delta G_0$ is set to "0". In the releasing direction correcting subroutine in S24, computation of the gradual decrease correction value $\Delta G_{tmp}$ in S245 is skipped. The target vehicle deceleration $G^*$ is corrected so as to be the previous target vehicle deceleration $G_{old}^*$ in S246. In the several control cycles after this correction, the target vehicle deceleration $G^*$ is maintained at the previous target vehicle deceleration $G_{old}^*$. When the target vehicle deceleration $G^*$ becomes substantially equal to the previous target vehicle deceleration $G_{old}^*$, correction ends. Namely, as a result of such correction, as shown by the heavy solid line in the figure, the target vehicle deceleration $G^*$ is corrected such that the value immediately before switching the operating direction is maintained in a predetermined operation range.

After the correction process when the operating direction is switched is performed, the target cylinder hydraulic pressure Pwc* of each wheel cylinder 96 is decided based on the target vehicle deceleration $G^*$ which is decided previously, or which is decided and corrected, in S25 in the control routine. In S26, the hydraulic pressure of the wheel cylinder 96 is controlled based on the target cylinder hydraulic pressure Pwc*. More particularly, the cylinder hydraulic pressure Pwc of each wheel cylinder 96 is detected by the cylinder hydraulic pressure sensor 146, and the wheel braking device 80 is controlled based on the deviation between the target cylinder hydraulic pressure Pwc* and the cylinder hydraulic pressure Pwc. Since S25 and S26 are common control processes, description thereof will be omitted.

Figure 19:
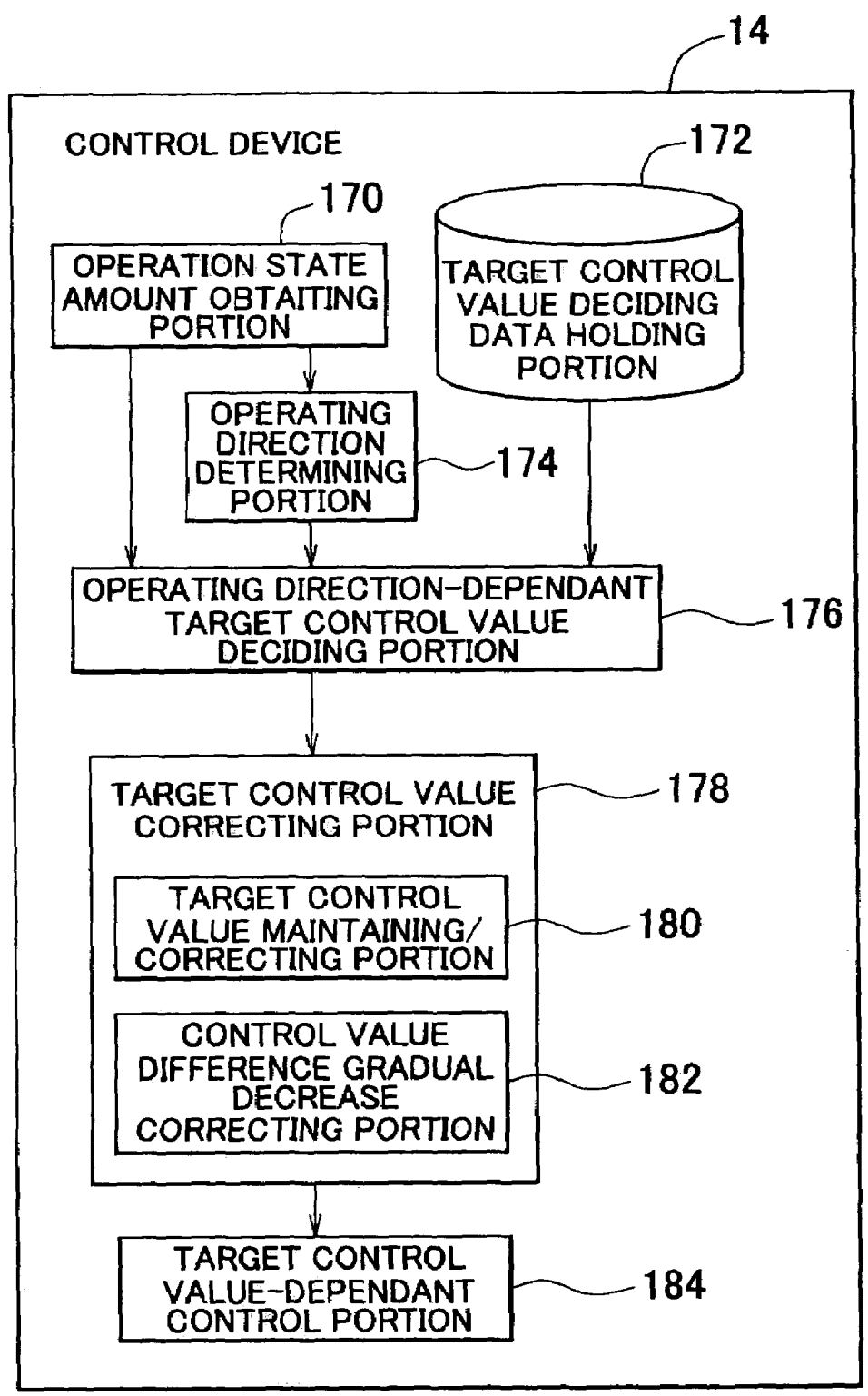
FIG. 19 is a schematic function block diagram related to the control function of the control device included in the braking system for a vehicle.

Control of the control system according to the embodiment has been described so far. As mentioned above, control is performed by the control device 14. As mentioned above, the hardware of the control device 14 is mainly provided with the brake electronic control unit 162. The control device 14 is shown in FIG. 19 as a functional block diagram. Hereafter, each function of the control device 14 will be described.

The control device 14 includes an operation state amount obtaining portion 170 which obtains the master pressure Pm, that is the operation state amount, and the pedal stroke ST. The operation state amount obtaining portion 170 includes a portion of the input/output interface 156 which receives the signals detected by the master pressure sensor 54, the stroke sensor 56, and the operation ON/OFF sensor 58 in the computer 160, and a portion which performs S12. The control device 14 includes a target control value deciding data holding portion 172. The above-mentioned map is stored in the ROM 166 of the computer 160, and the portion which stores the map constitutes the target control value deciding data holding portion 172. Also, the control device 14 includes an operating direction determining portion 174 as the portion for determining the operating direction of the brake pedal 20. The operating direction determining portion 174 includes a portion of the computer 160, for performing the operating direction determining subroutine in S12.

The control device 14 also includes an operating direction-dependant target control value deciding portion 176 for deciding the target control value based on the operation state amount obtained by the operation state amount obtaining portion 170, the data stored in the target control value deciding data holding portion 172, and the operating direction of the operating member which is determined by the operating direction determining portion 174. The operating direction-dependant target control value deciding portion 176 includes the portion of the computer 160, for performing S14 to S18. The control device 14 further includes a target control value correcting portion 178 for correcting the target control value decided by the operating direction-dependant target control value deciding portion 176. The target control value correcting portion 178 includes the portion of the computer 160 for performing S19 to S24. The target control value correcting portion 178 includes a target control value maintaining/correcting portion 180 and a control value difference gradual decrease correcting portion 182, which perform correction according to two methods different from each other. The target control value maintaining/correcting portion 180 performs the process which is related to FIG. 17B and FIG. 18B. The control value difference gradual decrease correcting portion 182 performs process which is related to FIG. 17A and FIG. 18A. Also, the control device 14 includes a target control value-dependant control portion 184 which controls the control device 10 based on the target control value decided by the operating direction-dependant target control value deciding portion 176 or the target control value corrected by the target control value correcting portion 178. The target control value-dependant control portion 184 includes the portion of the computer 160, for performing S26, the drive circuit 164, the control circuit 166, and the like.

Figure 20A:
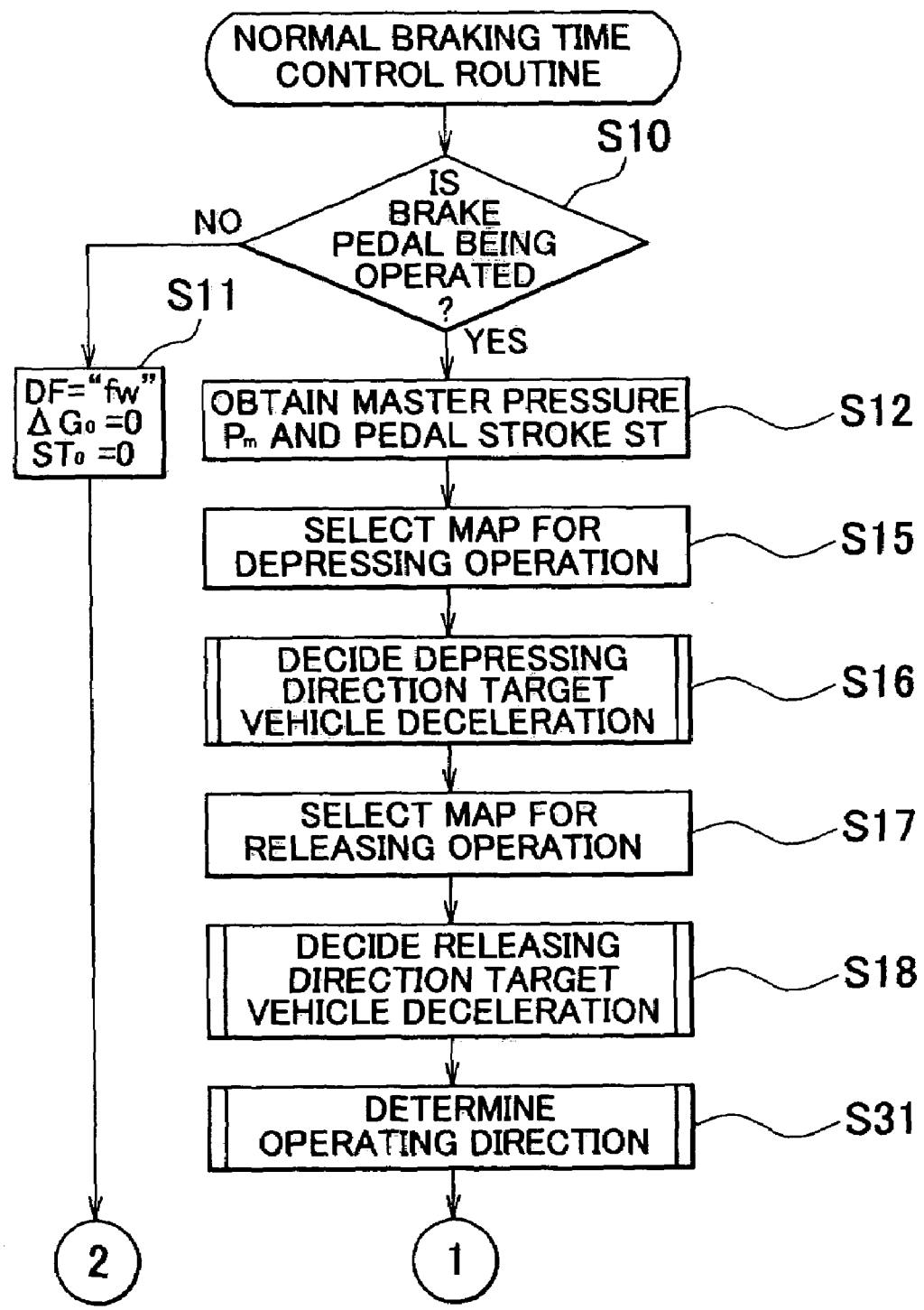
FIG. 20A and 20B are a flowchart of a normal braking time control routine which is performed in the control in a modified embodiment.
Figure 20B:
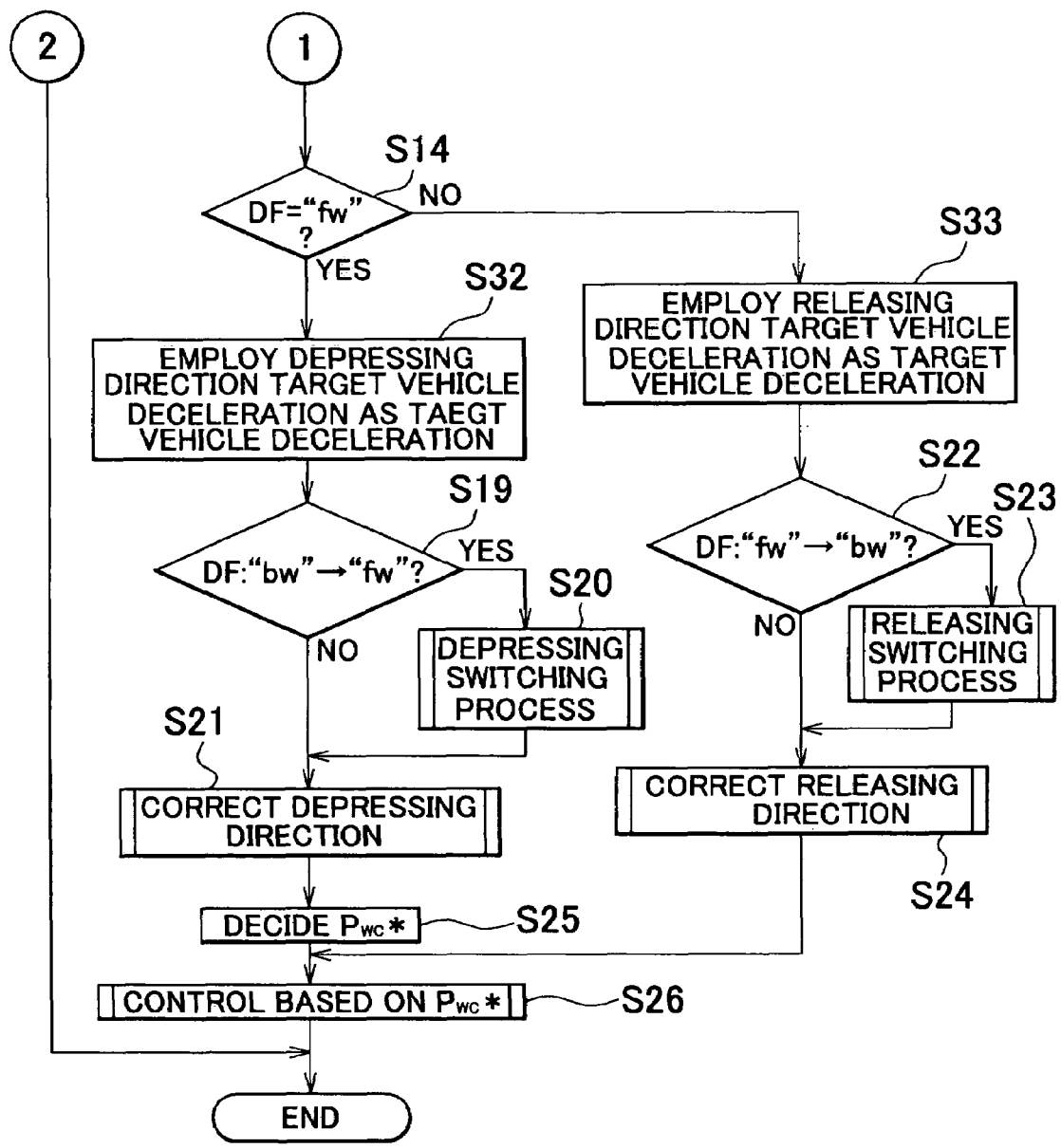

Hereafter, a modified embodiment related to control will be described. In terms of control, the braking system according to the above-mentioned embodiment may be realized in the following modified embodiment. Generally, in the modified embodiment, the operating direction is determined by a method which is different from the method in the above-mentioned embodiment. FIGS. 20A and 20B show the flowchart of the normal braking time control routine related to the control in the modified embodiment. The flowchart is obtained by modifying part of the flowchart show in FIG. 11. Therefore, the same numerals are assigned to the steps which perform the same process as the steps in the above-mentioned embodiment. Modifications will be described briefly as follows using the flowchart in FIGS. 20A and 20B, and description on the same processes will be omitted.

In the normal braking time control routine in the modified embodiment, after the master pressure Pm, and the pedal stroke ST are obtained in S12, the target vehicle deceleration $G_{fw}^*$ of the depressing direction and the target vehicle deceleration $G_{bw}^*$ of the releasing direction are decided in S12. This is the same as the process in S15 to S18 in the above-mentioned embodiment.

Figure 21:
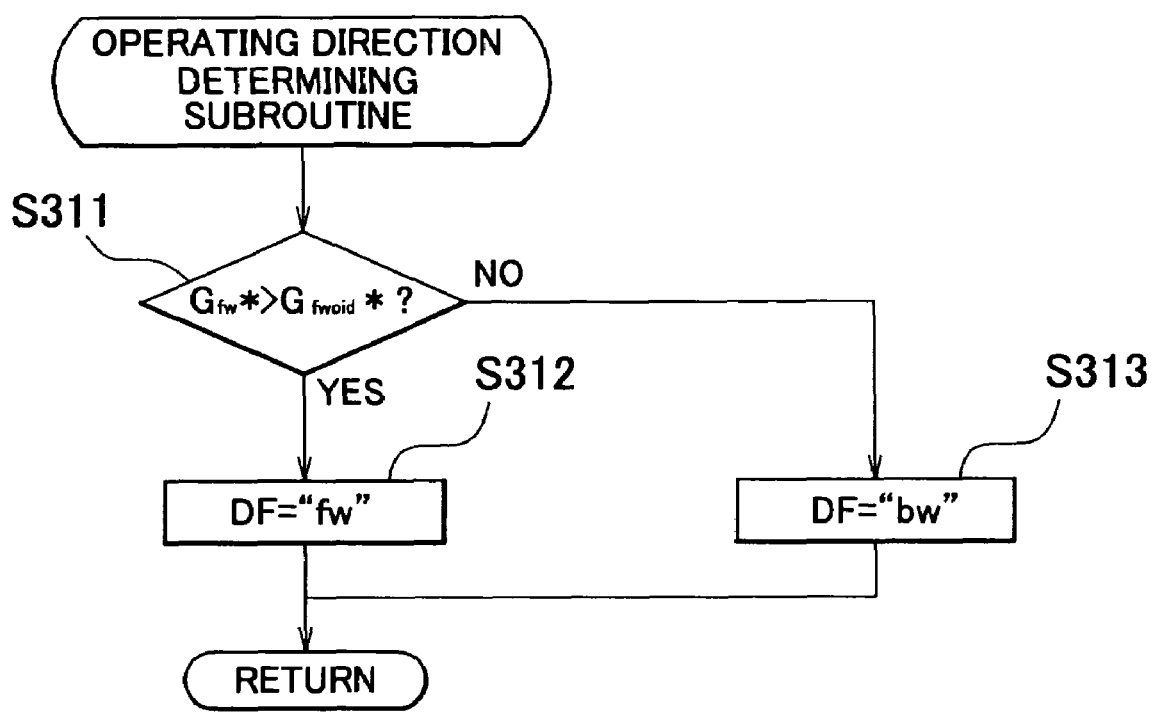
FIG. 21 is a flowchart of an operating direction determining subroutine which is performed in the normal braking time control routine according to the modified embodiment.

After the target vehicle deceleration $G_{fw}^*$ and $G_{bw}^*$ are decided, the operating direction determining subroutine in S31 is performed. FIG. 21 shows the flowchart of the operating direction determining subroutine in the modified embodiment. In the subroutine in S31, the operating direction of the brake pedal 20 is determined based on the target vehicle deceleration $G_{ST}^*$ of the depressing direction. The RAM 152 stores the previous depressing direction target vehicle deceleration $G_{fwold}^*$ which is the depressing direction target vehicle deceleration $G_{fw}^*$ when the previous routine is performed. When the depressing direction target vehicle deceleration $G_{fw}*$ is larger than the previous depressing direction target vehicle deceleration $G_{fwold}*$, it is determined that the operating direction is the depressing direction. When the condition that the depressing direction target vehicle deceleration $G_{fw}*$ is larger than the previous depressing direction target vehicle deceleration $G_{fwold}*$ is satisfied, the operating direction flag DF is made "fw" in S312. When the condition that the depressing direction target vehicle deceleration $G_{fw}*$ is larger than the previous depressing direction target vehicle deceleration $G_{fwold}*$ is not satisfied, the operating direction flag DF is made "bw" in S313. In the modified embodiment, the operating direction is determined based on the depressing direction target vehicle deceleration $G_{fw}*$. However, the operating direction may be determined based on the releasing direction target vehicle deceleration $G_{bw}*$.

After the depressing determining subroutine in S31 is performed, the operating direction flag DF is determined in S14. When it is determined that the operating direction flag DF is "fw", the depressing direction target vehicle deceleration $G_{fw}*$, which has been decided in advance, is employed as the target vehicle deceleration G* in S32. When it is determined that the operating direction flag DF is "bw", the releasing direction target vehicle deceleration $G_{bw}*$, which has been decided in advance, is employed as the target vehicle deceleration G*. After S32 is performed, S19 and the following steps are performed. After S33 is performed, S22 and the following steps are performed. S19 and the following steps are the same as those in the above-mentioned embodiment.

In the braking system for performing control in the modified embodiment, the operating direction determining portion shown in FIG. 19 includes a portion for performing S15, S16, and S31. The operating direction-dependant target value deciding portion 176 includes a portion for performing S15 to S18, S14, S32, and S33.

When a target control amount is decided based on an operating state amount of an operating member, target control values are set to values different from each other depending on an operating direction (a braking force increasing direction or a braking force decreasing direction) of the operating member even in the same operation state (S13 to S18), and the braking device is controlled based on the target control value (S25 and S26). In a low braking force control range, the target control value in the braking force decreasing direction is set to a value smaller than the target control value in the braking force increasing direction. Also, in a high braking force control range, the target control value of the braking force decreasing direction is set to a value larger than the target control value in the braking force increasing direction. Thus, it is possible to reduce hysteresis specific to a hydraulic friction brake. In addition, if the target control value is corrected in order to reduce rapid change in the braking force due to a difference between the target control values when the operating direction is switched (S19 to S26), operating feeling is further enhanced.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less ore only a single element, are also within the spirit and scope of the invention.

What is claimed is:

1. A braking system for a vehicle, comprising:
a braking device for braking a vehicle;
an operating device which includes an operating member that is operated by a driver of the vehicle in a braking force increasing direction that is an operating direction in which a braking force of the braking device is increased, or in a braking force decreasing direction that is an operating direction in which the braking force of the braking device is decreased; and
an electronic control device that decides a target control value for controlling the braking device based on an operation state amount and an operation state of the operating member and that controls the braking device based on the decided target control value,
wherein the control device includes an operating direction-dependant target control value deciding portion that determines a relationship between the operation state amount and the target control value based on the operation state of the operating member and uses the determined relationship to set at least one of:
an increasing direction target control value that is the target control value when the operating member is operated in the braking force increasing direction, and
a decreasing direction target control value that is the target control value when the operating member is operated in the braking force decreasing direction with the increasing direction target control value and the decreasing direction target control value being different from each other even when the operating member is at a same operation state at least in part of a control range by either lowering the decreasing direction target control value relative to the increasing direction target control value in a low braking force control range where the braking force of the braking device is low or increasing the decreasing direction target control value relative to the increasing direction target control value in a high braking force control range where the braking force of the braking device is high.

2. The braking system for a vehicle according to claim 1, wherein the operating direction-dependant target control value deciding portion sets the decreasing direction target control value to a value lower than the increasing direction target control value.

3. The braking system for a vehicle according to claim 2, wherein the operating direction-dependant target control value deciding portion sets the decreasing direction target control value to a value lower than the increasing direction target control value in a low braking force control range where the braking force of the braking device is low.

4. The braking system for a vehicle according to claim 1, wherein the operating direction-dependant target control value deciding portion sets the decreasing direction target control value to a value higher than the increasing direction target control value.

5. The braking system for a vehicle according to claim 4, wherein the operating direction-dependant target control value deciding portion sets the decreasing direction target control value to a value higher than the increasing direction target control value in a high braking force control range where the braking force of the braking device is high.

6. The braking system for a vehicle according to claim 1, wherein the operating direction-dependant target control value deciding portion sets the decreasing direction target control value to a value lower than the increasing direction target control value in a low braking force control range where the braking force of the braking device is low, and also sets the decreasing direction target control value to a value higher than the increasing direction target control value in a high braking force control range where the braking force of the braking device is high.

7. The braking system for a vehicle according to claim 1, wherein the operating direction-dependant target control value deciding portion includes a target control value correcting portion which performs correction so as to suppress a rapid change in the target control value due to a control value difference between the increasing direction target control value and the decreasing direction target control value, when there is the difference at the time of switching the operating direction of the operating member.

8. The braking system for a vehicle according to claim 7, wherein the target control value correcting portion includes a target control value maintaining/correcting portion which maintains the target control value immediately before switching the operating direction until the control value difference disappears after switching the operating direction of the operating member.

9. The braking system for a vehicle according to claim 7, wherein the target control value correcting portion includes a control value difference gradual decrease correcting portion which performs correction based on a value for gradually decreasing the control value difference at the time of switching the operating direction at a predetermined rate, in an operation range of the operating member, which is set after switching the operating direction.

10. The braking system for a vehicle according to claim 1, wherein the control device decides a target vehicle deceleration as the target control value, and controls the braking device based on the target vehicle deceleration.

11. The braking system for a vehicle according to claim 1, wherein the control device decides the target control value based on at least an operation amount of the operating member, as the operation state amount.

12. The braking system for a vehicle according to claim 1, wherein the control device decides the target control value based on at least an operating force related amount of the operating member, as the operation state amount.

13. The braking system for a vehicle according to claim 12, wherein the operating device includes a cylinder device having a cylinder in which liquid is provided and a piston which applies pressure to the liquid in accordance with the operating member, and the control device decides the target control value based on at least a pressure of the liquid as the operating force related amount.

14. The braking system for a vehicle according to claim 13, wherein the operating device includes a stroke simulator which generates an operation amount corresponding to the operating force of the operating member in accordance with the cylinder device.

15. The braking system for a vehicle according to claim 1, wherein the braking device includes a friction braking device.

16. The braking system for a vehicle according to claim 15, wherein the friction braking device is a hydraulic friction braking device.

17. The braking system for a vehicle according to claim 15, wherein the friction braking device includes a rotator which rotates integrally with a wheel, a friction sliding member which generates a frictional force by sliding with the rotator, a friction sliding member holding device which holds the friction sliding member such that the friction sliding member can come close to or move away from the rotator, and a friction sliding member pressing device which presses the friction sliding member to the rotator.

18. The braking system for a vehicle according to claim 17, wherein the friction braking device is a hydraulic friction braking device, and the friction sliding member pressing device includes a pressing cylinder device which has a piston and a cylinder in which an operating fluid is provided, and which presses the friction sliding member to the rotator using a pressure of the operating fluid.

19. A braking system for a vehicle, comprising:

a braking device for braking a vehicle;

an operating device that includes an operating member that is operated by a driver of the vehicle in a braking force increasing direction that is an operating direction in which a braking force of the braking device is increased, or in a braking force decreasing direction that is an operating direction in which the braking force of the braking device is decreased; and an electronic control device that decides a target control value for controlling the braking device based on an operation state amount of the operating member and that controls the braking device based on the decided target control value, wherein:

the control device includes an operating direction-dependant target control value deciding portion that sets, based on a first predetermined relationship between an increasing direction target control value and the operation state amount of the operating member, the increasing direction target control value that is the target control value when the operating member is operated in the braking force increasing direction, and sets, based on a second predetermined relationship between a decreasing direction target control value and the operation state amount of the operating member, the decreasing direction target control value that is the target control value when the operating member is operated in the braking force decreasing direction with the increasing direction target control value and the decreasing direction target control value being different from each other even when the operating member is at a same operation state at least in part of a control range by either lowering the decreasing direction target control value relative to the increasing direction target control value in a low braking force control range where the braking force of the braking device is low or increasing the decreasing direction target control value relative to the increasing direction target control value in a high braking force control range where the braking force of the braking device is high, and the first predetermined relationship is different than the second predetermined relationship.

20. A method for braking a vehicle using a braking device for braking a vehicle, the method comprising:

determining a state of an operating device that includes an operating member that is operated by a driver of the vehicle in a braking force increasing direction that is an operating direction in which a braking force of the braking device is increased, or in a braking force decreasing direction that is an operating direction in which the braking force of the braking device is decreased;

determining an operating state amount of the operating member;

determining electronically, based on the determined state of the operating device, a target control value for controlling the braking device based on an operation state amount of the operating member and that controls the braking device based on the decided target control value, and wherein:

if it is determined that the operating device is in a braking force increasing state, the step of determining a target control value comprises using a first predetermined relationship between an increasing direction target control value and the determined operation state amount of the operating member, to determine an increasing direction target control value that is the target control value when the operating member is operated in the braking force increasing state, if it is determined that the operating device is in a braking force decreasing state, the step of determining a target control value comprises using a second predetermined relationship between a decreasing direction target control value and the determined operation state amount of the operating member, to determine a decreasing direction target control value that is the target control value when the operating member is operated in the braking force decreasing state, and the first predetermined relationship is different than the second predetermined relationship even when the operating member is at a same operation state by either lowering the decreasing direction target control value relative to the increasing direction target control value in a low braking force control range where the braking force of the braking device is low or increasing the decreasing direction target control value relative to the increasing direction target control value in a high braking force control range where the braking force of the braking device is high.

* * * * *